July 30, 1935.  G. R. PENNINGTON  2,009,676
SHOCK ABSORBER FOR MOTOR VEHICLES
Original Filed Nov. 19, 1928   5 Sheets-Sheet 2
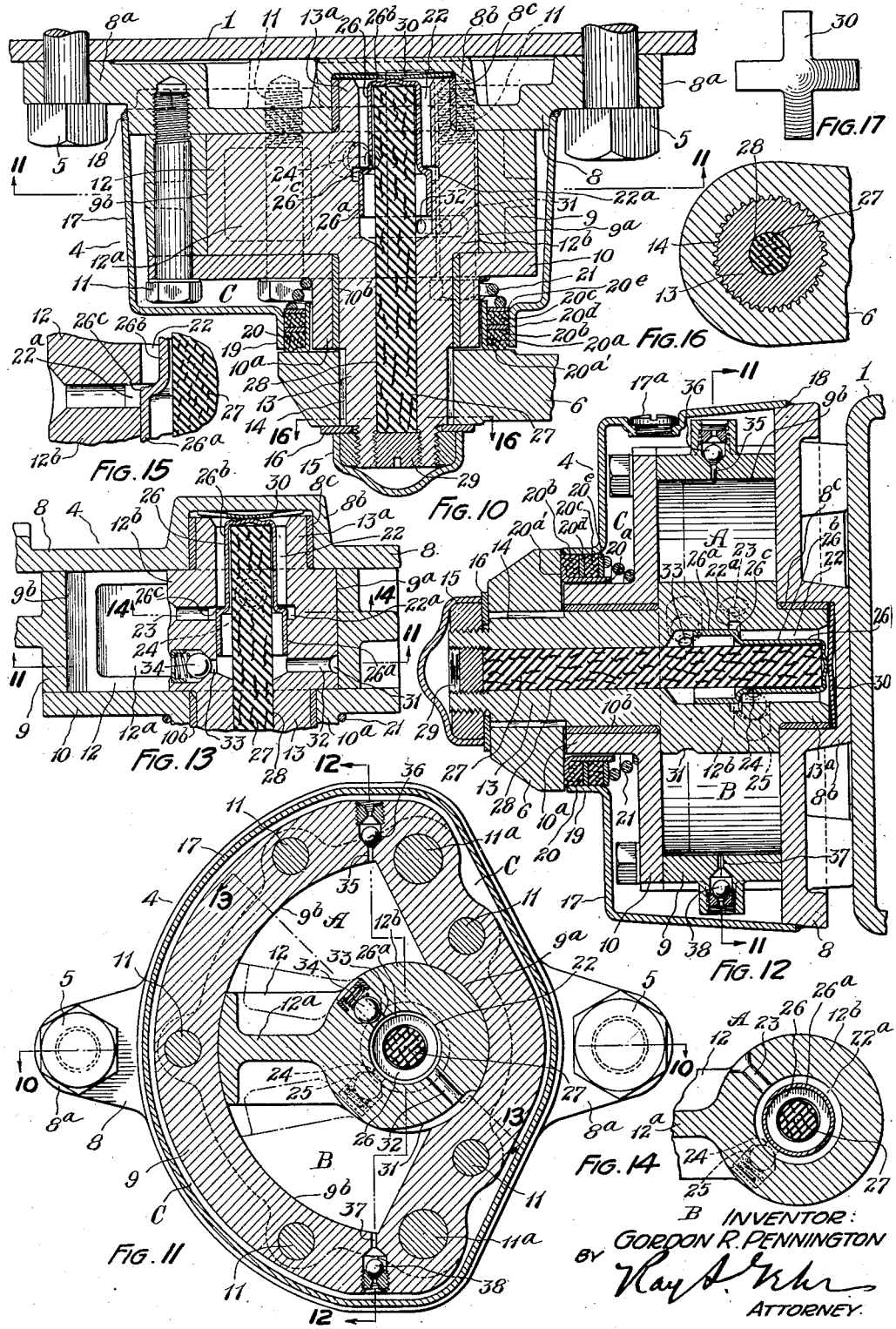
INVENTOR:
GORDON R. PENNINGTON
BY
ATTORNEY.

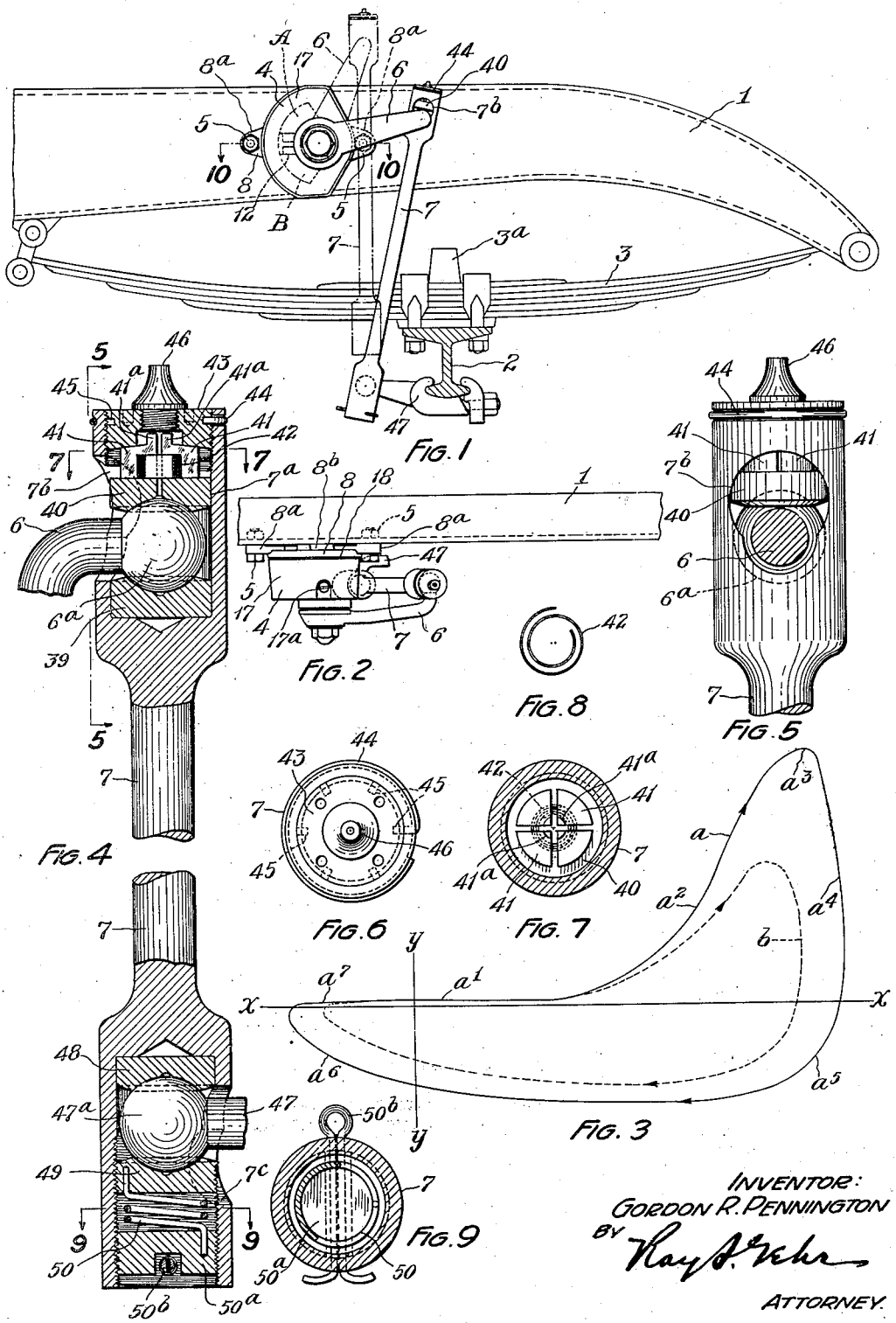

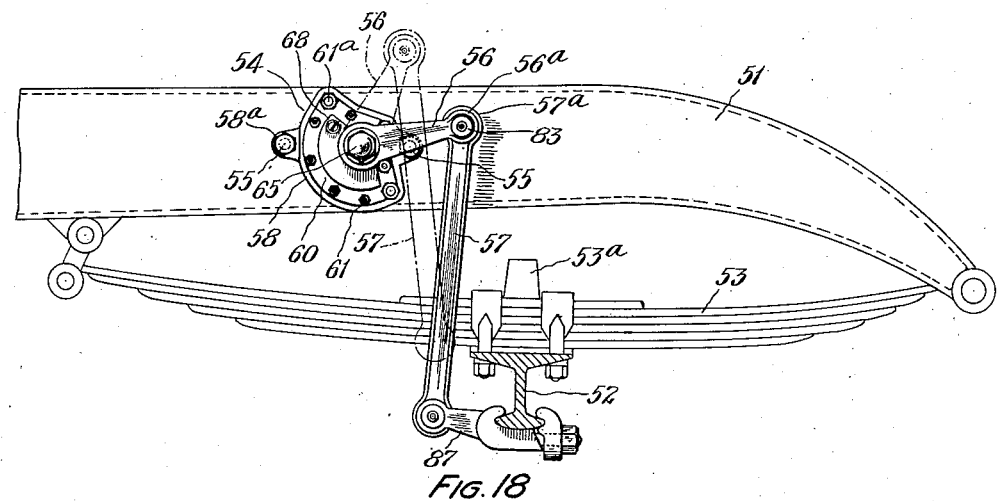
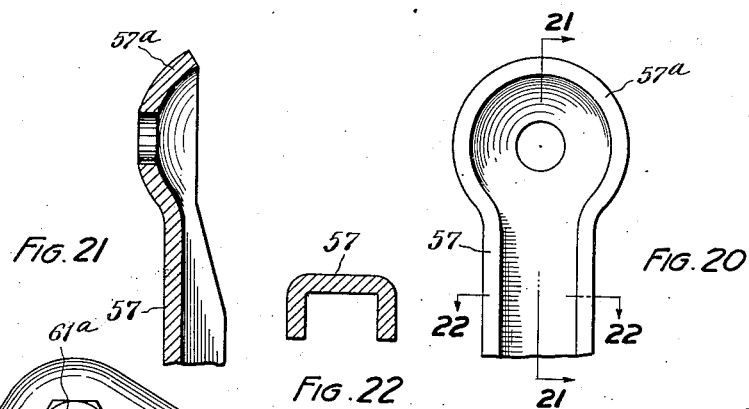
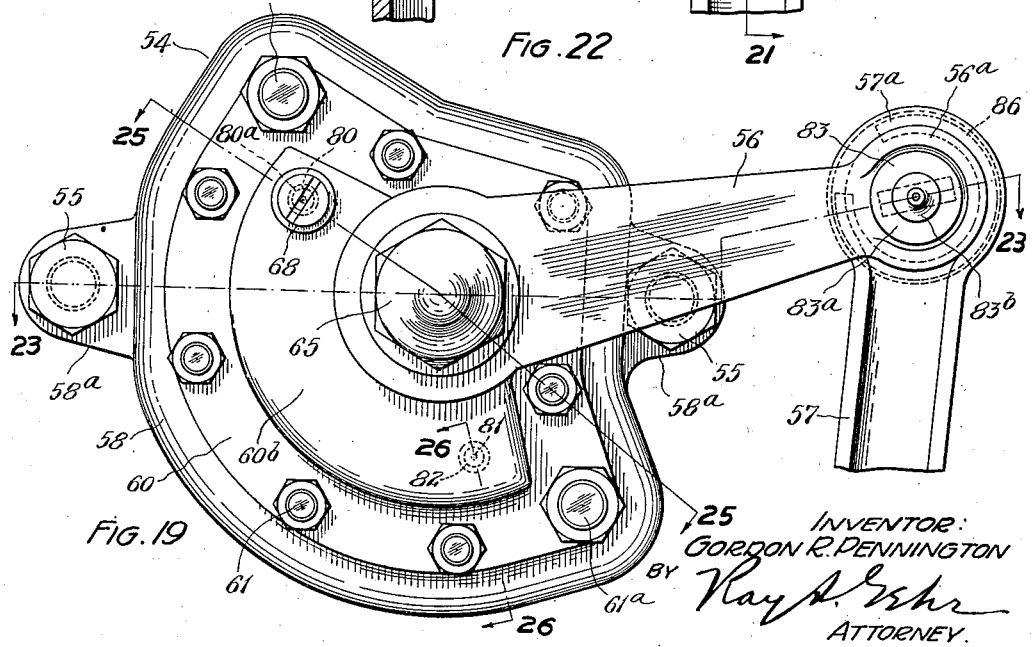

July 30, 1935.   G. R. PENNINGTON   2,009,676
SHOCK ABSORBER FOR MOTOR VEHICLES
Original Filed Nov. 19, 1928   5 Sheets-Sheet 4
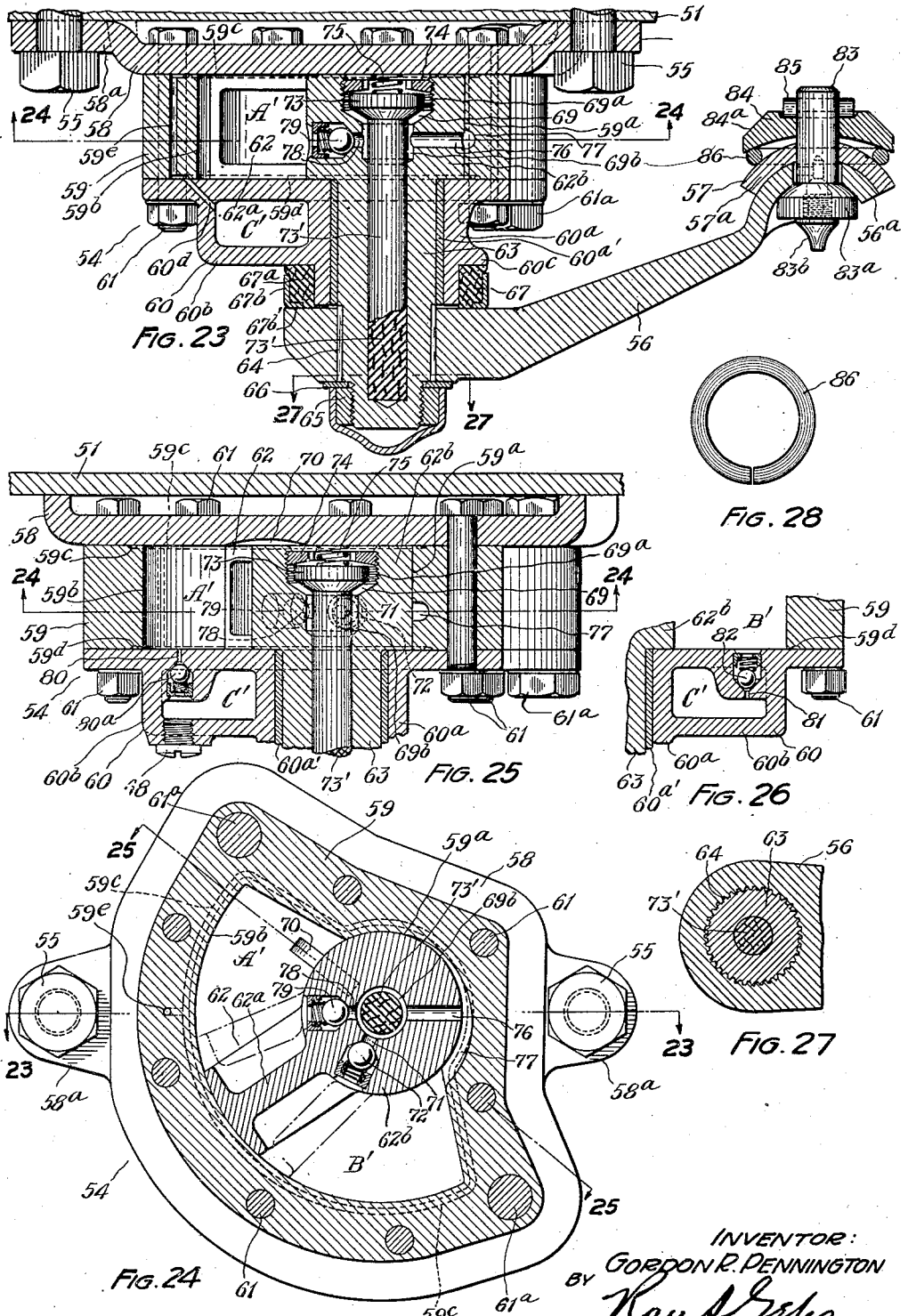

July 30, 1935.  G. R. PENNINGTON  2,009,676
SHOCK ABSORBER FOR MOTOR VEHICLES
Original Filed Nov. 19, 1928   5 Sheets-Sheet 5
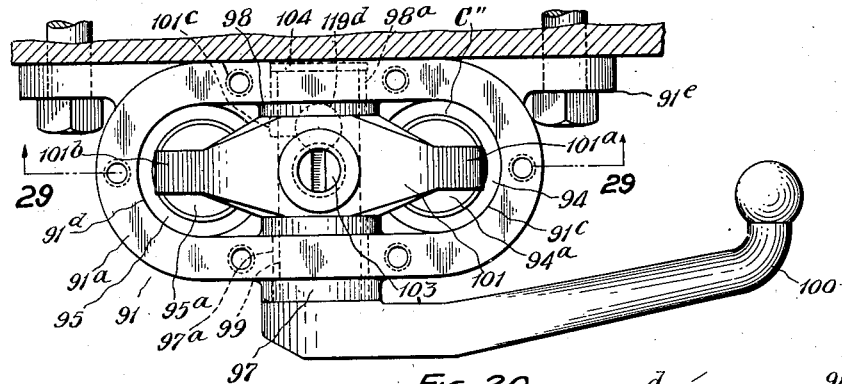
INVENTOR:
GORDON R. PENNINGTON
BY
ATTORNEY Patented July 30, 1935

2,009,676

UNITED STATES PATENT OFFICE 2,009,676

SHOCK ABSORBER FOR MOTOR VEHICLES

Gordon R. Pennington, Cleveland, Ohio, assignor to Pennington Engineering Company, Cleveland, Ohio, a corporation of Ohio Application November 19, 1928, Serial No. 320,413
Renewed October 9, 1933

28 Claims. (Cl. 188—89)

The invention relates to shock absorbers designed to control and supplement the action of the suspension springs of vehicles, and the improvements relate particularly to shock absorbers of the double-acting hydraulic type although the application of some features of the invention is not limited to the double-acting type. In some of its aspects the invention relates to improvements that are especially applicable to shock absorbers having such operating characteristics as the shock absorber patented in my U. S. Reissue No. 17,409.

One object of the invention is to reduce the size and weight of double-acting hydraulic shock absorbers and particularly of shock absorbers using the cycle of operation patented in my said Reissue No. 17,409.

Another object of the invention is to simplify and reduce the cost of production of double-acting hydraulic shock absorbers, and particularly shock absorbers utilizing the cycle of operation patented in said patent Reissue No. 17,409.

A further object of the invention is to provide a shock absorber capable of automatic adjustment for effective operation under a wide range of operating conditions.

Another object of the invention is to provide an improved means for preventing loss of working fluid from the shock absorber.

Another object of the inventon is to provide improved link connecting means between the energy absorbing mechanism of the shock absorber and one of the parts of the vehicle.

A further object of the invention is to provide a double-acting hydraulic shock absorber having a compact and pleasing appearance.

A further object of the invention is to provide an improved method of making the casing structure of vane-type hydraulic shock absorbers.

Other objects of the invention, more or less ancillary or incidental to those above noted, will be apparent from the following detailed description of some of the preferred forms of construction, said description having reference to the accompanying drawings.

In the drawings:

Figure 1 is a side elevation showing one form of my improved shock absorber applied to the front frame and axle parts of a motor vehicle so as to control the movement of one of the front springs of said vehicle.

Figure 2 is a plan view showing the shock absorber and a portion of the vehicle frame of Fig. 1.

Figure 3 is a diagram representing the resisting forces set up by the shock absorber to relative movement of the frame and axle parts of the vehicle.

Figure 4 is an enlarged view partly broken away and partly in section of the shock absorber coupling link and associated parts.

Figure 5 is a sectional elevation of the upper end of the coupling link, the section being taken on the line 5—5, Fig. 4.

Figure 6 is an upper end view of the coupling link.

Figure 7 is a section on the line 7—7, Fig. 4.

Figure 8 is a detail view of a spring part detached from the upper end of the coupling link.

Figure 9 is a section on the line 9—9, Fig. 4.

Figure 10 is a section on the line 10—10, Figs. 1 and 11.

Figure 11 is a section on the line 11—11, Figs. 10, 12 and 13.

Figure 12 is a section on the broken line 12—12, Fig. 11.

Figure 13 is a fragmentary section on the line 13—13, Fig. 11.

Figure 14 is a fragmentary section on the line 14—14, Fig. 13.

Figure 15 is an enlargement of a fragmentary portion of Fig. 13 to more clearly illustrate a feature of the construction.

Figure 16 is a section on the line 16—16, Fig. 10.

Figure 17 is a detail view of the valve spring of the device, detached.

Figure 18 is a side elevation showing a modified form of my shock absorber applied to the front frame and axle parts of the vehicle to control the front spring thereof.

Figure 19 is an enlarged side elevation of the main parts of the shock absorber shown in Fig. 18.

Figure 20 is an enlarged elevation of the upper end of the connecting link shown in Fig. 18.

Figure 21 is a section on the line 21—21, Fig. 20.

Figure 22 is a section on the line 22—22, Fig. 20.

Figure 23 is a section on the broken line 23—23, Fig. 19, and on the line 23—23, Fig. 24.

Figure 24 is a section on the lines 24—24, Figs. 23 and 25.

Figure 25 is a section on the line 25—25, Figs. 19 and 24.

Figure 26 is a fragmentary section on the line 26—26, Fig. 19.

Figure 27 is a section on the line 27—27, Fig. 23.

Figure 28 is a detail view of one of the parts of the coupling link.

Figure 29 is a vertical section through the main part of a second modified form of shock absorber in which I employ pistons of the plunger or reciprocating type, the section being taken on the line 29—29, Figs. 30 and 31.

Figure 30 is a plan view of the apparatus shown in Fig. 29 with cover removed.

Figure 31 is a vertical section on the line 31—31, Fig. 29.

Figure 32 is a horizontal section on the line 32—32, Figs. 29 and 31.

Figure 33 is a fragmentary vertical section taken on the broken line 33—33, Fig. 32.

Figure 34 is a fragmentary vertical section taken on the broken line 34—34, Fig. 32, the thermostatic valve parts being in the positions occupied when the pistons of the shock absorber are in their normal positions.

Figure 35 is an enlarged fragmentary view of the thermostatic valve part shown in Fig. 34 but with said valve parts in the positions occupied by them when the vehicle spring is compressed and the shock absorber piston which resists such compression is in its down position.

Referring in detail to the construction illustrated, and first to the form of construction shown in Figs. 1 to 17 inclusive, 1 is a channel side bar of an automobile chassis frame, 2 is the front axle of the automobile and 3 one of the semi-elliptic springs upon which the chassis frame is suspended in the usual manner from the axle. 3ª is a rubber bumper secured to the upper side of the spring 3 in position to engage the under side of the frame channel 1 when the spring 3 is fully compressed. 4 designates as an entirety the main body or casing part of one of my improved shock absorbers which is rigidly secured to the frame part 1 by bolts 5, 5. 6 is the operating crank arm of the shock absorber and 7 is a link by which the crank arm is connected to the axle 2.

The construction of the main or body part of the shock absorber is shown in detail in Figs. 10 to 17. There is a casing structure which comprises a rear plate-like part 8 which is preferably a steel forging, an intermediate part 9 which is preferably an iron casting and a front plate-like part 10 which, like the rear part is preferably a steel forging. The parallel side surfaces of the intermediate casing part 9 nicely fit the adjacent plane surfaces of the rear and front parts 8 and 10 and the three parts are tightly and rigidly secured together by cap screws 11, 11 and dowels 11ª, 11ª. The dowels fit apertures in the parts 8, 9 and 10 and the cap screws pass through apertures in the front part 10 and the intermediate part 9 and engage threaded closed bottom holes in the rear part 8. Further reference will be made to these parts later in the description. The part 8 is formed with lugs 8ª, 8ª to receive the securing bolts 5, 5 previously referred to. The casing structure includes additional parts which will presently be described.

On reference to Figs. 10, 11 and 12 it will be observed that the intermediate casing part 9 forms the peripheral wall of an approximately sector-shaped chamber. In this chamber is fitted a piston 12 of the vane or swinging type. The piston is connected rigidly and preferably integrally as shown to a shaft 13 which extends through the front casing member 10 and is rotatably supported in a bearing boss 10ª thereof which is fitted with a bushing 10ᵇ. A rearwardly extending shaft section 13ª has a bearing support in a hollow boss 8ᵇ formed on the casing part 8 and fitted with a bushing 8ᶜ. The piston 12 comprises a vane part 12ª having a web and flange construction, which is clearly shown in Figs. 11 and 13, and a hub part 12ᵇ which carries the vane and which is somewhat greater in diameter than the shaft 13. The peripheral wall of the sector-shape chamber of the casing is formed with a hollow cylindrical extension at 9ª to accommodate the hub part 12ᵇ of the piston (Fig. 11). The chamber wall at 9ª and the peripheral wall thereof at 9ᵇ, the inner plane surfaces of the casing parts 8 and 10 and the various surfaces of the piston which are adjacent to and cooperate with these casing surfaces are all carefully machined or finished, as hereinafter explained, to afford working fits between the piston and the walls of the casing chamber that will prevent undue leakage of the working fluid from one side of the piston to the other.

The crank arm 6 of the device is mounted on the outer projecting end of the shaft section 13, the shaft and the aperture of the crank arm being toothed or serrated at 14 so that the crank can be placed on the shaft and rigidly held against turning in different angular positions in relation to the shaft and the piston 12. The crank is secured against axial movement on the shaft by a closed nut 15 which engages the threaded end of the shaft and an interposed washer 16 of soft metal or other suitable material is interposed between the nut and the outer face of the crank arm so as to tightly seal the joint between the crank arm and the shaft.

For the purpose of providing a reserve reservoir for working fluid and at the same time affording a liquid tight closure for the entire apparatus, the casing structure also includes an outer cupped part 17 which can appropriately be stamped or pressed from sheet steel. The rear open side of this cupped casing part is formed to snugly fit the periphery of the rear casing part 8 and is rigidly secured to the latter part with a liquid tight joint. Such a joint can be formed in various ways but I prefer to make the connection by forming a welded or brazed joint 18 by the use of known methods and apparatus. I shall hereinafter employ the term "welded" as comprehensive of welding, brazing and the like.

At its front side the casing member 17 is formed with a large aperture and a flange 19 which surrounds the bearing boss 10ª of the casing with an interposed annular space in which is arranged a packing designated as an entirety by 20. This packing comprises a tubular metal ring 20ª, two packing rings 20ᵇ and 20ᶜ of relatively soft liquid proof or liquid repellant material such, for example, as rubber, a metal ring 20ᵈ interposed between the rings 20ᵇ and 20ᶜ and a second metal ring 20ᵉ on the inner side of the ring 20ᶜ. The tubular ring 20ª loosely surrounds the bearing boss 10ª and is formed with an outwardly turned flange 20ª′ which engages the adjacent inner face of the crank arm 6. The ring 20ª may suitably be made of brass. The soft packing ring 20ᵇ has its outer surface pressed outward against the adjacent inner face of the crank arm 6 at points radially outside of the flange 20ª′. A strong coiled spring 21 interposed between the casing member 10 and the packing ring 20ᶜ serves to press the entire packing 20 outward against the crank arm 6 and at the same time expand the soft packing rings 20ᵇ and 20ᶜ radially into tight engagement with the outer side of the metal ring 20ª and the inner side of the flange 19.

As indicated in Fig. 11, the piston 12 divides the sector-shape cavity of the casing structure into a chamber A above the piston and a chamber B below the piston; and, as is clearly shown in Figs. 10, 11 and 12, a relatively large irregular chamber C is provided between the inner casing structure made up of the parts 8, 9 and 10 and the cupped outer casing member 17. In the operation of the device the chambers A and B and the chamber or reservoir C are occupied by a body of liquid which constitutes the working fluid of the device, glycerine or oil of suitable consistency being preferably employed. The casing member 17 is provided at its upper side with a filling aperture and with a suitable screw closure 17a to provide for the introduction of the liquid. In the operation of the device the chamber A constitutes a pressure chamber for resisting the upward movement of the piston 12 and thus checking rebound of the vehicle springs while the chamber B serves as a pressure chamber to resist the downward movement of the piston 12 to check and control the compression of the vehicle springs. The features of construction by which these functions are accomplished will now be explained.

On comparison of Figs. 10, 11, 12 and 13 it will be observed that the shaft 13 of the piston is formed with a large axial bore 22 which extends substantially through the piston hub section of the shaft and opens through the end of the shaft section 13a. As shown in Fig. 13 the hub of the piston is formed with a radial passage 23 which leads from the pressure chamber A into an annular enlargement 22a of the axial bore 22. And at approximately right angles to the passage 23 is a radial passage 24 in the hub of the piston, said passage leading from the axial passage 22 to the pressure chamber B. In the passage 24 is a spring pressed check valve 25 which permits flow only in a radially outward direction through the passage 24. The conduit formed by the passages 23, 22 and 24 is controlled by a valve means comprising a valve body or valve proper 26. The valve body 26 which is made of metal is tubular in form with one end open and the other closed. The open end 26a of the valve is of larger diameter than the closed end portion 26b, the diameter of the larger end 26a being such as to nicely fit the bore 22 of the piston, while the diameter of the smaller part 26b is such as to afford a relatively large annular space between it and the wall of the bore 22. The sharp annular shoulder 26c at the junction of the larger and smaller parts of the valve serves in conjunction with the wall of the annular enlargement 22a to nicely control liquid flow from the chamber A through the passages 23, 22 and 24 to the chamber B. The position of the valve 26 in the passage 22 is determined by an elongated thermostatic member 27 which serves in effect as the stem of the valve. The valve stem or member 27 as shown is in the form of a slender cylinder or pencil of material having a coefficient of thermal expansion differing largely from the metal composing the piston and its shaft. The material which I preferably employ for this purpose is ebonite which has a coefficient of expansion very much higher than that of iron or steel and is substantially unaffected by most liquids and chemicals. It will be noted that the valve stem 27 at one end fits within the smaller section of the valve 26, engaging the closed end of the latter, and from this point it extends throughout the length of the passage 22 and substantially through the shaft 13 which is bored out at 28 to receive it with an easy fit, the outer end of the bore being threaded to receive a screw plug 29 which serves as an adjustable abutment for the outer end of the valve stem. The plug 29 can be held in adjusted position by peening or by making it with a tight fit. At the inner end of the valve 26 and interposed between it and the adjacent inner surface of the bearing boss 8b is a four armed spring 30 which yieldingly presses the valve and the valve stem against the adjustable abutment 29.

On reference to Figs. 11 and 13 it will be noted that the periphery of the hub portion of the piston is formed with a circumferentially extending tapered groove 31 which communicates at its deeper end with a passage 32 extending radially inward from the groove 31 to the axial bore or passage 22; and diametrically opposite the passage 32 is a passage 33 leading from the passage 22 into the pressure chamber A, this latter passage being controlled by a check valve 34 which opens radially outward and permits flow only in that direction. It will thus be seen that the groove 31, passage 32, passage 22 and passage 33 constitute a conduit affording communication between the pressure chamber B and the pressure chamber A and that the effective capacity of this conduit varies with the angular position of the piston 12 since the movement of the piston brings different parts of the tapered groove 31 adjacent the lower edge of the chamber wall 9a. In other words the piston hub 12b with its tapered groove 31 and passages 32, 22 and 33 and the said lower portion of the adjacent wall surface 9a serve as a valve which diminishes the effective capacity of the outlet conduit of the chamber B as the piston 12 moves downward, as viewed in Fig. 11. The object of this, as will presently more fully appear, is to gradually increase the resistance offered by the device to the compression of the vehicle springs.

From the foregoing it will be seen that the two main pressure chambers A and B are joined by two conduits, namely, that formed by passages 23, 22 and 24 and that formed by groove 31 and passages 32, 22 and 33, said conduits constituting parallel connections between the chambers A and B.

While the thermostatic valve stem 27 is subject to the hydraulic pressure, this pressure is always that on the discharge or low pressure side of the throttle valves of the piston 12. Consequently the stem 27 could be made, if need be, of some material liable to deformation under heavy pressure, because the construction above described wholly obviates such heavy pressure on the stem 27. Furthermore, the construction of the valve 26 and its relation to the conduit controlled by it, are such that the valve in operation is substantially balanced with respect to the fluid pressure in said conduit on the inlet side of the valve. In other words, the thermostatic element or part of the valve is not in any way subjected to heavy pressures or stresses and the conditions, therefore, favor its reliable operation.

The fact that the bore 22, at both sides of valve 26, is always in free communication with a low pressure chamber of the instrument has another important advantage, namely, that liquid under pressure, leaking through the bearing of shaft extension 13a cannot accumulate and build up a pressure that would force the vane 12 against front plate 10 and cause objectionable wear.

At the top of the pressure chamber A (Figs. 11 and 12) is an air bleeding passage 35 of small bore which leads from the chamber A to the reservoir chamber C. This passage is controlled by a gravity check valve 36 in a manner which will later be described. At the bottom of the pressure chamber B is a small passage 37 which leads from said chamber to the reservoir chamber C and which is controlled by a gravity check valve 38.

In the manufacture of the shock absorber I prefer to drill the holes in the intermediate casing part 9 and in the front part 10 for the cap screws 11, 11 about $\frac{1}{32}$" larger in diameter than the cap screws so that a small amount of float is possible between the three main elements of the casing. I determine and hold the alignment of these three casing elements by means of the dowels 11$^a$, the holes for which in the three elements are located in the machining process in the following manner. In the rear plate 8 the holes for the cap screws 11 are drilled and tapped and the holes for the dowels 11$^a$, as well as the bore designed to receive the bushing 8$^c$, are machined in the same jig, the holes for the dowels being drilled $\frac{1}{32}$" under size. After the bushing has been pressed into place the inside bore of this bushing and the dowel holes are simultaneously bored to exact size in a three spindle machine which will give the exactly correct spacing and diameter of these bores. Similarly the intermediate casing part 9 is first drilled with the holes for the cap screws 11 about $\frac{1}{32}$" over-size and the holes for the dowels 11$^a$ about $\frac{1}{32}$" under size, these holes being located from the inner finished surface 9$^b$ of the sector-shape wall of the casing member, said surface 9$^b$ and also the surface 9$^a$ having been machined by a broaching operation. The dowel holes are then bored to exact size and at the same time the surface 9$^a$ may, if desired, be additionally finish bored to correct for possible broaching errors. In the latter case the boring is done in a three spindle boring machine, while if only the dowel holes are bored a two spindle machine is used. In either case the part 9 is located in the jig from the surfaces 9$^b$, 9$^b$, thus insuring exact relative location of the dowel holes and the surfaces 9$^a$ and 9$^b$. The front part 10 of the casing can be machined in exactly the same manner as the back plate 8 or the following alternative procedure may be used. First the cap screw holes are drilled $\frac{1}{32}$" over size, then the dowel holes are drilled $\frac{1}{32}$" under size, then the dowel holes are finish bored and simultaneously the bearing boss 10$^a$ is bored, all of these operations being performed in the same jig. The part 10 may then be hardened, preferably by a nitriding process, and finally the bushing 10$^b$ is pressed into place and burnished. With either procedure the shaft bearing of the plate 10 is located by a boring operation in the bearing boss and with either procedure the result is that upon the assembly of the three parts the dowels will hold these in such position that the bores of the two bushings and the axis of the surfaces 9$^b$ and 9$^a$ will be in exact alignment. The plate 10 is hardened, as above stated, to prevent objectionable wear of the contacting surfaces of said plate and the piston 12 incident to the pressure of the spring 21.

As has been stated, a link 7 serves to connect the crank 6 of the device with the axle 2 of the vehicle. The joints at the two ends of the link 7 are of novel construction and will now be described. The crank arm 6 is bent laterally and is formed with a spherical end 6$^a$ and the enlarged upper end of the link 7 is formed with an axial bore 7$^a$ to receive the bearing for the spherical end 6$^a$ of the crank, the side wall of the chambered part of the link being apertured at 7$^b$ to receive the laterally bent end of the crank arm. The bearing for the spherical end 6$^a$ comprises a lower block 39 and an upper block 40 both of which are cupped to fit the spherical end 6$^a$ of the crank. Upon the plane top of the upper bearing block 40 rest four sector-shape blocks 41, 41 which are formed at their top sides with conical surfaces of low pitch and have at their inner corners upstanding lugs 41$^a$, 41$^a$. The under sides of the blocks 41 are recessed to accommodate a radially compressible and expandible spring such as the spiral spring 42, the expansion of which tends to press these blocks 41 radially apart. Such radial movement of the blocks is prevented by the conical under surface of the screw plug 43 which engages the upper threaded end of the link and is locked in adjusted position by means of a snap ring 44 the inturned end of which extends through an aperture in the side of the link 7 to engage any one of a circumferential series of sockets 45, 45 in the screw plug 43. The screw plug is preferably supplied with a lubricant fitting 46 through which oil or grease may be introduced to the bearing, it being understood that the side aperture 7$^b$ may be closed with a suitable boot or cover (not shown) in a manner that is well known. It will be observed that the under side of the screw plug 43 is formed with a conical surface which fits the upper conical surfaces of the blocks 41. The pitch of the conical surfaces is such that while the force of expansion of the spring 42 is sufficient to press the blocks 41 radially apart and thus press the upper bearing block 40 toward the lower bearing block 39 to compensate for the wear in the bearing, reverse or radially inward movement of the blocks cannot be caused by the forces to which the bearings are subjected. In other words the adjusting device is non-overhauling.

In the manufacture of the coupling just described, the blocks 41 are readily made from rolled steel bars of sector-shape cross section by assembling four such bars to form a round rod and machining them simultaneously in an automatic screw machine. In assembling the coupling one end of a short section of thin tubing (not shown) is passed over the lugs 41$^a$ of the blocks 41 so as to hold the blocks together, the expansion spring 42 is then inserted between the blocks and the latter inserted through the end of the link into position upon the bearing block 40. The screw plug 43 without the lubricant nipple 46 is then screwed into position, the assembling tube referred to projecting through the threaded aperture of the block 43 in which the lubricant nipple 46 is later mounted. When the screw plug 43 has been screwed down into contact with the tops of the blocks 41, the assembling tube referred to can be withdrawn, thus freeing the blocks 41 for outward movement by a spring 42 insofar as such movement is permitted by the plug 43.

The lower end of the link 7 is connected to the axle 2 by means of a bracket 47 which is detachably bolted in a well known manner to the axle. The bracket 47 is formed with a spherical end 41$^a$ which is engaged by a bearing in the end of the link 7 differing somewhat in construction from that in the upper end of the link. The lower enlarged end of the link is bored out axially to receive an upper bearing block 48 and a lower bearing block 49 both of which are cupped to fit the spherical end 47ª, the side wall of the link being formed with a lateral aperture 7ᶜ to receive the spherical end of the bracket 47. The lower bearing block 49 is threaded to fit the correspondingly threaded axial bore of the link and is automatically adjusted toward the upper bearing block 48 to compensate for wear by means of a helical spring 50, the upper end of which is anchored in the bearing block 49 while the lower end is anchored in a screw plug 50ª which is adjustably secured in the threaded bore of the link by means of a cotter pin 50ᵇ. When the parts are assembled the helical spring 50 is placed under tension so that it constantly tends to turn the bearing block 49 in the threaded bore in a direction to adjust said block toward the block 48. In this way there is provided an automatic take-up to compensate for wear, and this can be accomplished by the use of the light spring 50 because the low pitch of the screw threads of the bearing block 49 renders the device non-overhauling.

On reference to Fig. 1 it will be observed that with the piston 12 in its normal or intermediate position corresponding to the normal load of the vehicle with the latter standing still or moving over a smooth and even surface, the crank arm 6 is in an approximately horizontal position and at an angle only slightly under 90° with the link 7, while when the vehicle spring 3 is fully compressed the crank 6 (as shown by dotted lines) has turned to a position approaching the vertical and is at a very acute angle with the link 7.

In the use of my shock absorbers each vehicle is preferably fitted in the usual manner with a set of four of the devices, one to control the action of each of the four springs.

In describing the operation of the shock absorber shown in Figs. 1 to 17 and above described, it is to be observed at the outset that while the apparatus can be designed as to size and proportions of parts, etc. to meet widely varying conditions of service, it is especially applicable to and is preferably designed for operation upon a cycle having the principal features of the cycle disclosed in my U. S. Reissue No. 17,409 previously referred to. That is to say, the apparatus is preferably designed to cooperate with vehicle springs that are softer or more flexible than springs heretofore employed with other types of shock absorbers, the construction of the apparatus being such that it offers a resistance to the first part of the compression of the vehicle springs which is small and preferably so slight as to be practically negligible, i. e. unnoticeable to a rider in the vehicle, while after such initial compression of the springs occurs the resistance to further compression afforded by the shock absorber increases relatively rapidly as such compression occurs so that a large resistance is developed to supplement the resistance of the vehicle springs, the maximum resistance being reached at or near the end of the spring-compressing movement of the parts. On the other hand the resistance afforded by the apparatus to the rebound of the compressed vehicle springs is preferably never equal to the maximum resistance opposed to the compression of the springs but nevertheless attains a value at or near the normal position of the parts on their movement during rebound which is substantially greater than the resistance offered to the first part of the spring-compressing movement.

The shock absorber is made ready for use by filling its working chambers with a suitable liquid such for example as a 95 per cent solution of glycerin in alcohol. The filling may be accomplished by removing the screw closure 17ª of the casing and pouring the liquid into the reservoir chamber C, meanwhile swinging the piston from its lowermost position to its highest position and if necessary repeating this movement several times until it is certain that sufficient liquid is drawn from the reservoir C through the passage 37 into the lower chamber B and from it forced into the upper chamber A so that both chambers B and A are completely filled with liquid. It will be understood that when the piston 12 is swung from its lower to its upper position the chamber B is filled with liquid while air in the chamber A is forced out through the passage 35 into the reservoir chamber C and thence outward through the filling aperture, while on the downward movement of the piston 12 the liquid in the chamber B is transferred through the passages in the piston to the chamber A. By repeating the movement of the piston it is insured that the chambers A and B are completely filled with liquid, and this having been done, the reservoir C may also be nearly filled with the liquid to provide a reserve supply.

With the shock absorber mounted on the vehicle and the parts of the apparatus in their relative positions shown in the drawings, if the vehicle wheel strikes an obstruction the axle 2 is lifted, the spring 3 is correspondingly compressed and at the same time the crank arm 6 of the shock absorber is swung toward its dotted line position shown in Fig. 1 while the piston 12 is swung downward from its normal position as shown in Fig. 1 and Fig. 11. At the beginning of the downward movement of the piston 12 the liquid in the chamber B offers little resistance to the movement of the piston because the capacity of the valve groove 31 is great enough to permit a relatively free outflow of the liquid from the chamber B through said groove, passage 32, passage 22 and passage 33 into the upper chamber A, the check valve 34 opening to permit such movement of the liquid. However after the downward movement of the piston 12 has continued for a certain distance corresponding to a certain compression of the vehicle spring 3 the more rapidly tapering form of the valve groove 31 causes a greater and greater throttling of the liquid flowing from the pressure chamber B so that energy is absorbed or dissipated in this way at an increasing rate as the piston continues its movement and correspondingly increased resistance to the compression of the spring is afforded by the shock absorber. The resistance developed by the shock absorber will of course vary with the size of the obstruction and the velocity with which the vehicle strikes it. I prefer to design the parts and clearances of the shock absorber so that it will offer sufficient resistance to the compression of the spring 3 to enable it and said spring to fully absorb all shocks that will ordinarily be encountered by the driver of average care and rely upon the rubber bumper 3ª to supplement the shock absorber and spring in the case of the rarely encountered extremely heavy shock. I am thus enabled to make the shock absorber parts smaller and lighter than would be feasible if the rubber bumpers were not relied upon as stated, and this is a consideration of considerable importance when the shock absorber works upon the cycle patented in my said Reissue No. 17,409. However, it is to be understood that the groove 31 can be restricted to such a degree as to enable the shock absorber to carry out the functions of the rubber bumper, rendering the latter unnecessary. While the weight of the parts of the shock absorber and the closeness of fits must be increased if this is done, a distinct improvement in the riding quality of the vehicle is secured thereby because the shock absorber, unlike the rubber bumper, ceases to exert a separating force between the axle and the frame the moment these parts cease to approach each other, with the result that the energy and rebound tendency imparted to the frame is less than when the rubber bumper is used. For those cars for which the best obtainable riding quality is more important than cost it will be desirable to eliminate the rubber bumper and have the shock absorber perform its function.

When the upward movement of the axle 2 in relation to the frame 1 is arrested the spring 3 tends to return to its normal loaded form and this so-called "rebound" of the spring starts to swing the crank arm 6 downward and the piston 12 upward. This movement of the piston places the liquid in the chamber A under pressure and forces it through the piston passage 23, past the thermostatic valve part 26$^c$ into the passage 22 and thence through the passage 24 and past the check valve 25 into the pressure chamber B. The positioning of the thermostatic valve 26 is such that a sufficient resistance is offered to the outflow of the liquid from the chamber A into the chamber B to adequately check the rebound of the springs. When relatively soft and flexible suspension springs are employed and the shock absorber is designed, as preferred, to adequately supplement the resistance of the springs to compression when obstructions are encountered the force of this resistance afforded by the shock absorber is relatively large at its maximum and the resisting force afforded by the shock absorber to the rebound of the spring would never exceed the said maximum resistance to the compression of the spring and ordinarily would at all times be less than said maximum resistance, while it should materially exceed the minimum resistance afforded to the compression of the springs at the time the parts are at or near their normal position in the rebound movement.

I prefer to make the resistance to the rebound of the springs at the time the shock absorber parts are at or near their normal position in the rebound movement of a substantial amount in excess of the minimum of resistance afforded to the compression of the springs, as just stated, because the shock absorbers in this manner add greatly to the lateral stability of the vehicle, or in other words greatly resist the tendency of the body of the vehicle to rock or sway laterally while it is passing over surfaces that may be smooth yet sufficiently undulating to cause such rocking or swaying. This feature of the apparatus is of especial importance when the shock absorbers are designed to operate upon the cycle patented in my aforesaid Reissue No. 17,409 since with that cycle of operation the resistance of the shock absorbers to the compression of the springs when the parts are at or near their normal positions must be so small as to be practically unnoticeable in order that the advantage of the soft vehicle springs may be had, and consequently the said resistance to the compression of the springs is not sufficient to afford the lateral stability referred to and it is only by making the resistance to the rebound force of the springs amply large when the parts are at or near their normal positions that the said lateral stability is attained.

The character of the forces set up in the pressure chambers A and B of the preferred form of the device is illustrated by the diagram shown in Fig. 3. In this diagram the forces are measured vertically above and below the horizontal line or axis $x-x$. The vertical line $y-y$ represents the normal position of the shock absorber piston 12 and movement of the piston in either direction from that normal position is measured horizontally on the axis $x-x$. In the diagram the full line curve $a$ and the dotted line curve $b$ represent two complete cycles of the piston movement such as occur when the wheels of the vehicle strike an upwardly projecting obstruction, the curve $a$ corresponding to a larger obstruction than the curve $b$ or to an obstruction encountered at greater speed than that represented by the curve $b$. Considering the full line curve $a$, it will be observed that when the obstruction was encountered there was a considerable downward movement of the piston 12 during which there was very slight resisting pressure set up in the chamber B, this pressure being represented by the practically horizontal section $a^1$ of the curve $a$ to the right of the vertical line $y-y$. However, as the downward movement of the piston 12 continued, the rapidly tapering end portion of the valve groove 31 caused a rapid increase of the pressure in the chamber B which is represented by the sharply upwardly inclined portion $a^2$ of the curve. The pressure reaches its maximum value at the point $a^3$ near the end of the downward movement of the piston 12 and then, as the speed of the piston movement rapidly diminishes, the pressure in the chamber B correspondingly rapidly falls as indicated by the portion $a^4$ of the curve, the pressure falling to zero of course at approximately the end of the piston movement. At this point the rebound movement of the spring 3 begins, causing a reversal of the movement of the piston 12 and relatively rapid building up of pressure in the chamber A which is represented by the portion $a^5$ of the curve. The pressure in the chamber A measures the resistance to the rebound of the spring and after reaching a maximum continues at or slightly below that maximum value for a portion of the rebound movement and then falls off as the vehicle and shock absorber parts approach their normal positions represented by the vertical line $y-y$. The momentum of the parts moved by the rebound or expansion of the springs carries said parts beyond their normal positions and the pressure in the chamber A continues but with diminished intensity as indicated by the section $a_6$ of the curve to the left of the line $y-y$, the pressure returning to zero at or near the end of the rebound movement. From this latter point the parts are returned again to normal position, the piston 12 moving downward and creating the very slight pressure in the chamber B represented by the section $a^7$ of the curve. The dotted line curve $b$ in the diagram, Fig. 3, represents the pressures set up in the chambers A and B when the vehicle encounters a lesser shock or obstruction than represented by the curve $a$, the curve being of the same general character as the curve $a$ but indicating the lesser pressures generated. While the curve illustrating the cycle of force variations will vary in form with the speed of the vehicle and the contour of the road, curves $a$ and $b$ represent usual forms.

The size and taper of the valve groove 31 in the hub of the piston 12 are preferably determined empirically to satisfy the conditions of operation determined by the size and weight of the vehicle upon which the shock absorber is to be used. However the effect of the valve groove 31 can be varied quite materially by angularly adjusting the piston 12 in relation to the crank arm 6, this being accomplished by angular adjustment of the crank on the piston shaft which is permitted by the toothed or serrated surfaces of these parts. By such adjustment of the shock absorber piston in relation to its crank arm the device can readily be adapted to the different weights of the open and closed types of bodies of a car model of a given wheel base. To facilitate the positioning and adjusting of the crank on the piston shaft reference marks may be placed on the adjacent surfaces of these parts where they are engaged by the washer 16. In Fig. 11 the full and broken lines represent three of the different positions to which the piston 12 can be angularly adjusted for a given angular position of the crank 6.

Similarly the position of the valve 26 is empirically determined in order that it may afford the desired resistance to the rebound of the springs, the position of the valve, as previously described, being determined by the adjustment of the abutment plug or screw 29. When once this adjustment has been determined for a given vehicle the resistance is automatically maintained at a nearly constant value, regardless of temperature changes, by reason of the differential expansion of the valve stem 27 in relation to the metal parts of the piston and its shaft. It will be apparent that a relation exists between the perimeter and width of opening of the valve part 26ᶜ and the differential expansion of the valve stem 27 and the metal piston and shaft structure, so that the diameter of the bore 22 in the piston, which in turn determines the effective diameter of the valve 26, will be determined by the said differential expansion, which in turn is determined by the length of the stem 27 and the respective coefficients of expansion of the stem and of the said metal structure.

In the operation of the shock absorber when the piston 12 starts its upward movement the pressure in the chamber A causes fluid in the chamber to enter the air bleeding passage 35. If any air has found its way into the chamber A it first passes the ball valve 36 and then as soon as liquid enters the passage 35 the ball valve is lifted by the flowing liquid against the seat above the valve thus effectively closing the passage 35 as long as pressure is maintained in the chamber A. If during this upward movement of the piston 12 liquid is not delivered from the chamber A into the chamber B rapidly enough to keep the latter chamber filled a corresponding lowering of the pressure in the chamber B would result and thereupon liquid from the reservoir C will be drawn past the check valve 38 through the passage 37 into the chamber B to make up the deficiency therein. When the piston 12 moves downward the valve 38, of course, remains upon its seat and keeps the passage 37 closed. While any air present in the reservoir chamber C naturally collects at the top of said chamber the churning of the liquid in said chamber may cause absorption or occlusion of slight amounts of the air in the liquid therein so that slight amounts of air may pass through the passage 37 into the lower chamber B, but any small amount of air thus entering the chamber B promptly finds its way in the operation of the apparatus through the piston passages into the upper chamber A whence it is discharged in the manner previously described through the bleeding passage 35 back into the reservoir chamber C.

It will be observed that in the operation of the shock absorber any slight leakage of liquid that may occur from the pressure chambers A and B is received by the reservoir chamber C from which the supply of liquid in the chambers B and A is constantly replenished. Any leakage of liquid from the reservoir chamber C must occur between the flange 19 of the casing member 17 and the adjacent face of the crank arm 6, and such leakage is practically completely prevented by the packing 20. This packing, I believe, has novel and advantageous characteristics. The spring 21 presses the packing as an entirety outward against the inner face of the crank arm 6. This has the effect of pressing both the metal flange 20ᵃ' and the outer side of the soft ring 20ᵇ against the said face of the crank arm; and it has the further effect of expanding the soft rings 20ᵇ and 20ᶜ laterally against the inner wall of the casing flange 19 as well as against the outer wall of the metal ring 20ᵃ. The effect is to form liquid tight joints between the rings 20ᵇ and 20ᶜ on the one hand and the flange 19 and the ring 20ᵃ on the other hand and the friction between these parts is greater than that between the packing 20 and the face of the crank 6 so that the packing ring is held against turning and a sliding contact is maintained between the packing 20 and the crank 6 when the latter turns. In this connection it may be observed that the metal ring 20ᵈ tends to reduce the angular movement or distortion of the packing under reversals of the crank movement. At the beginning of the service of the device reliance can be placed upon the soft packing ring 20ᵇ of rubber or the like to maintain the joint between the packing 20 and the crank 6 tight and by the time wear of the packing 20ᵇ has occurred the metal flange 20ᵃ and the face of the crank 6 engaged by it will have worn in to form a good liquid tight metal-to-metal joint, and this joint is indefinitely maintained in the operation of the apparatus.

It will readily be appreciated that in a shock absorber operating upon the cycle which characterizes my previously mentioned Reissue No. 17,409, which operates in conjunction with very soft or flexible vehicle springs and which must therefore afford correspondingly high resistances to the compression of the springs, the forces transmitted by the connection between the vehicle axle and the hydraulic parts of the apparatus attached to the chassis frame and the axle structure are of considerable magnitude in both directions. Consequently it is essential that the joints connecting the link 7 to the crank arm 6 and to the axle bracket 47 should not only be amply strong but susceptible of adjustment for wear. These conditions are well met by the link joints at the upper and lower ends of the link. Notwithstanding the heavy forces transmitted by the link the very light spring 42 (or 50) serves to maintain the ball end of the link and its bearing blocks in operative contact because of the non-overhauling character of the takeup, and the use of such a light spring insures light bearing pressures except when heavy stresses are being transmitted through the coupling and this correspondingly diminishes wear of the bearing. Obviously the construction also affords a free or universal movement characteristic of the ball and socket joint so that there can be no binding in the joints.

I have already pointed out the changing angular relation between the link 7 and the crank 6, the angle increasing from nearly right angles when the parts are in their normal position as shown in full lines in Fig. 1 to a relatively small acute angle when the spring 3 is fully compressed. On reference to Fig. 1 it will be observed that the wide variation of this angular relationship is made possible by the fact that the axis of the piston shaft is relatively close to the front side of the shock absorber casing so that when the link 7 has been swung backward to the dotted line position shown in Fig. 1 it is relatively close to the said axis and makes the relatively small angle with the crank 6 which was referred to. Since it is highly desirable to avoid the use of overhung bearings, this latter feature is one of considerable practical importance in hydraulic shock absorbers which must afford the high resistances to spring compression necessary where very soft or flexible springs are employed, the significance of the arrangement being that as the pressure in the chamber B rapidly increases (as shown by the section $a^2$ of the curve $a$ in Fig. 3) to its high maximum value the mechanical advantage with which the spring compressing force is applied from the axle 2 of the vehicle to the piston 12 of the shock absorber is simultaneously diminished by the change of the angular relation between the link 7 and the crank 6 so that the size and strength of the liquid pressure parts of the shock absorber apparatus can be made substantially smaller than would be feasible if the said mechanical advantage were not changed as described, and still be adequately strong to perform their functions. It is to be observed that the fundamental principle here involved is embodied in the shock absorber construction disclosed in my previously mentioned Reissue No. 17,409 in which construction a reciprocating type of piston is employed. In the present construction I am enabled to utilize the same principle by adopting a single oscillating vane type of construction which permits the use of an eccentric casing with the axis of the piston shaft near one side of the casing. This type of construction has a very distinct additional advantage in a shock absorber designed to resist the compressive force of a soft vehicle spring. That is to say, the single vane form of construction is peculiarly adapted to furnish the very great resistance capacity necessary for such service since with it the necessary capacity can be secured with a casing structure smaller, more compact, lighter in weight and less costly than is possible where a multiple vane construction is used, because the capacity of a vane type piston varies as the square of its mean effective radius and my studies have shown that because of this principle a distinctly higher degree of compactness can be obtained for high capacity shock absorbers by the use of the single vane piston.

The method of machining the peripheral walls of the sector-shape chamber of the main casing of the shock absorber is highly advantageous because of its relatively low cost. This method is made possible, without sacrifice of desired accuracy, by the three-part construction of the main casing and by the novel method of machining the dowel holes and piston shaft bearings by locating them with reference to the broached surfaces. By combining with these features the outer welded-on casing member 17, I provide a reserve reservoir of large capacity, obviate the necessity of making the joints between the three casing parts 8, 9 and 10 absolutely liquid tight and secure a structure with a smooth and highly pleasing exterior.

The provision of a piston construction that includes all passages, ports and valves controlling the flow of liquid between the two main pressure chambers combines many of the machining operations in this single part of the apparatus and thereby facilitates manufacture.

Other advantages incident to the construction above described and more or less common to the other forms of construction yet to be described will be pointed out below more fully.

Referring now in detail to the form of apparatus shown in Figs. 18 to 28 inclusive, 51 is the channel side bar of an automobile chassis frame, 52 is the front axle of the automobile and 53 is one of the semi-elliptical springs upon which the chassis frame is suspended in the usual manner from the front axle. 53ª is a rubber bumper secured to the upper side of the spring 53 so as to engage the under side of the frame channel 51 when the spring 53 is fully compressed. 54 designates as an entirety the main body or casing part of the modified form of shock absorber, said casing being rigidly secured to the frame channel 51 by bolts 55, 55. 56 is the operating crank arm of the shock absorber and 57 is a link by which the crank arm is connected to the axle 52.

In Figs. 19, 23, 24, 25 and 26 is shown the construction of the main or body part of the shock absorber. There is a casing structure which comprises a rear plate-like part 58, an intermediate part 59 and a front plate-like part 60. Preferably the part 58 is a steel forging and the parts 59 and 60 are iron castings. As in the first form of construction, the parallel side surfaces of the intermediate casing part 59 nicely fit the adjacent plane surfaces of the rear and front parts 58 and 60, and the three parts are tightly and rigidly secured together by through bolts 61 and 61ª. The larger bolts 61ª suitably fit the apertures in the parts 58, 59 and 60 to serve as dowels. The intermediate casing part 58 is formed with lugs 58ª, 58ª to receive the securing bolts 55, 55 previously referred to. Additional parts and features of the casing structure will later be described. As indicated in Fig. 24, the intermediate casing part 59 forms the peripheral wall of an approximately sector-shape chamber. In this chamber is fitted a piston 62 of the vane or swinging type, said piston comprising a vane part 62ª having a web and flange construction as clearly shown in Figs. 23 and 24, and a cylindrical hub part 62ᵇ which carries the vane. The said hub part of the piston is rigidly and preferably integrally connected as shown to a shaft 63 which extends through the front casing member 60 and which is smaller in diameter than the piston hub and is rotatably supported in a bearing boss 60ª of the casing member, said boss being fitted with a suitable bushing 60ª'. The peripheral wall of the sector-shape chamber of the casing is formed with a hollow cylindrical extension at 59ª to accommodate the hub part 62ᵇ of the piston (Fig. 24). The chamber wall at 59ª and at 59ᵇ, the inner plane surfaces of the casing parts 58 and 60 and the various surfaces of the piston which are adjacent to and cooperate with these casing surfaces are all machined or finished to afford working fits between the piston and the walls of the casing member that will prevent undue leakage of the working fluid from one side of the piston to the other.

To provide a reserve reservoir for working fluid, the front casing member 60 is formed on its outer side with a chambered extension 60ᵇ of a sector-shape corresponding approximately to the shape of the main chamber of the casing, the reservoir chamber being connected, in a manner which will later be explained, to the main chamber of the casing.

The crank arm 56 of the device is mounted on the outer projecting end of the shaft 63, the shaft and the aperture of the crank arm being toothed or serrated at 64 so that the crank can be placed on the shaft and rigidly held against turning in different angular positions in relation to the shaft and the piston 62. The crank is secured against axial movement on the shaft by a closed nut 65 which engages the threaded end of the shaft and an interposed washer 66 of soft metal or other suitable material is interposed between the nut and the outer face of the crank arm so as to tightly seal the joint between the crank arm and the shaft.

An annular packing 67 surrounds the outer end of the bearing boss 60ᵃ of the casing and is interposed between the inner plane face of the crank arm 56 and the oppositely disposed parallel surface afforded by the outer side of the reservoir 60ᵇ and a shoulder-like extension 60ᶜ of the bearing boss 60ᵃ (Fig. 23). The annular packing 67 comprises a ring 67ᵃ of soft (or deformable) and resilient liquid tight or liquid repellant materal, such as rubber, and a metal ring 67ᵇ which surrounds the ring 67ᵃ and is formed with an inwardly turned flange 67ᵇ', the outer face of the said flange 67ᵇ' and a portion of the outer face of the soft ring 67ᵃ being arranged to engage the adjacent inner face of the crank 56 while the inner side of the ring 67ᵃ alone engages the oppositely facing surface of the casing structure. The dimensions of the soft ring 67ᵃ are such that said ring is placed under pressure and deformed when the parts are assembled with the result that the surfaces of said ring are tightly pressed against all of the surfaces with which the ring contacts and at the same time the flange 67ᵇ' of the metal ring 67ᵇ is yieldingly pressed against the inner face of the crank 56. With this construction an effective seal is provided preventing any material leakage of liquid around the shaft 63 and between the casing and the crank 56.

As indicated in Fig. 24, the piston 62 divides the sector-shape cavity of the casing structure into a chamber A' above the piston and a chamber B' below the piston; and as is shown in Figs. 23 and 25 the reservoir extension 60ᵇ provides a reservoir chamber C'. In the operation of the device the chambers A' and B' and the chamber or reservoir C' are occupied by a body of liquid which constitutes the working fluid of the device, glycerin or oil of suitable consistency being preferably employed. The reservoir 60ᵇ is provided at its upper side with a filling aperture and with a suitable screw closure 68 to provide for the introduction of the liquid. In the operation of the device the chamber A' constitutes a pressure chamber for resisting the upward movement of the piston 62 and thus checking rebound of the vehicle springs while the chamber B' serves as a pressure chamber to resist the downward movement of the piston 62 to check and control the compression of the vehicle springs. I shall now describe the features of construction which provide for the carrying out of these functions.

As shown in Figs. 23, 24 and 25 the hub of the piston is formed with a large axial bore 69 comprising a screw threaded section 69ᵃ of large diameter and a section 69ᵇ of smaller diameter. As shown in Figs. 24 and 25 the inner face of the casing member 58 is formed with a groove 70 which forms a passage connecting the chamber A' with the inner end of the bore 69 of the piston hub. 71 is a radial passage (Fig. 24) formed in the hub of the piston and affording communication between the smaller diameter section 69ᵇ of the bore 69 and the pressure chamber B', said passage 71 being controlled by a check valve 72 which permits flow only in a radially outward direction through the passage. The conduit formed by the passages 70, 69 and 71 is controlled by an automatically operating thermostatic valve 73 which is disposed in the larger section 69ᵃ of the bore 69 and is connected to an elongated stem 73' formed of material having a coefficient of thermal expansion differing very substantially from that of the metal of which the piston 62 and shaft 63 are formed. I find ebonite a suitable material for the valve stem 73' and prefer to form the valve 73 and the stem 73' integrally from this material. The shaft 63 is drilled out as shown to accommodate the elongated valve stem 73'. In the enlarged section 69ᵃ of the bore 69 is mounted an apertured valve seat 74 which has a threaded periphery to engage the internal threads of the bore 69 so that the valve seat can be adjusted toward and from the valve 73. A coil spring 75 interposed between the casing member 58 and the valve 73 presses said valve yieldingly away from the seat 74 and maintains the outer end of the valve stem 73' in engagement with the abutment formed by the closed end of the bore of the shaft which accommodates said stem. It will be seen that by adjustment of the valve seat 74 the valve 73 may be made to afford a nice control of the flow of liquid from the pressure chamber A' through the passages 70, 69 and 71 to the chamber B', and this control automatically substantially compensates for temperature variations because of the differential expansion of the valve stem 73' and the metal of the piston 62 and its shaft 63, ebonite having a substantially greater coefficient of expansion than the metal. The valve seat can be secured in adjusted position in any suitable manner, as by upsetting the screw threads with a suitable tool or by giving the seat a sufficiently tight fit in the threaded bore.

As shown in Figs. 23 and 24 the hub 62ᵇ of the piston is formed with a radial passage 76 which communicates at its inner end with the bore 69 and at its outer end is arranged to communicate with a tapered groove 77 formed in the surface 59ᵃ of the casing. In line with the passage 76 is a passage 78 in the piston hub, said passage being controlled by a check valve 79 which permits flow through said passage only in a radially outward direction. The groove 77, the passage 76 and the passage 78 constitute a conduit affording communication between the pressure chamber B' and the chamber A' and it will be observed that the capacity of this conduit is automatically varied as the piston moves as by such movement the outer end of the passage 76 is brought into communication with different parts of the tapered groove 77, the capacity of the conduit being diminished as the piston 62 moves downward during the compression of the vehicle spring. Consequently the effect of the taper of the groove 77 is to gradually increase the resistance offered by the device to the compression of the vehicle springs.

In this second form of the apparatus, just as in the first form, there are two conduits forming parallel connections between the two main pressure chambers, the one conduit being formed by passages 70, 69 and 71 and the other conduit by groove 77, and passages 76 and 78.

At the top of the pressure chamber A' (Figs. 19 and 25) is an air bleeding passage 80 which affords communication between the top of the chamber A' and the reservoir chamber C', said passage being controlled by a valve 80ª in a manner which will later be explained. At the bottom of the pressure chamber B' is a small passage 81 (Figs. 19 and 26) which affords communication between the reservoir chamber C' and the pressure chamber B' and which is controlled by a check valve 82 which is subject to a very light spring pressure.

While it is possible to machine or finish the meeting surfaces of the casing parts 58, 59 and 60 so that leakage of liquid from the pressure chambers A' and B' is thereby practically completely prevented, I prefer to provide additional assurance in this regard. To this end the lateral surfaces of the intermediate casing part 59 are provided with shallow grooves 59c and 59d which extend entirely around the sector-shape chamber of the casing inside of the securing bolts 61. These shallow grooves can be pressed in the faces of the casing member 59. The groove 59c is connected by a passage 59e (Fig. 23) with the groove 59d and the latter groove in turn is connected by a passage 60d with the reservoir chamber C'. It will thus be seen that any liquid finding its way from the sector-shape chamber of the shock absorber between the meeting faces of the casing sections will enter the grooves 59c and 59d and as any liquid thus entering these grooves cannot be under pressure it will readily drain into the reservoir chamber C'.

The joints at the two ends of the link 57 which operatively connects the crank 56 to the axle 52 of the vehicle are of novel construction. The crank arm 56 is bent laterally as shown in Fig. 23, to avoid overhanging of its supporting bearing, and is formed with a spherical cupped end 56ª while the link 57, which is preferably formed with a channel section to secure the combination of lightness and strength, has its upper end correspondingly formed with a spherical cupped section 57ª. The parts 56ª and 57ª are apertured as shown in Fig. 23 to receive a coupling pin 83, said pin fitting the aperture in the part 57ª while the larger aperture formed in the part 56ª affords a considerable clearance between the latter part and the pin. The pin 83 has a head 83ª the inner side of which has a spherical form to fit the adjacent abutting spherical surface of the part 56ª. On the smaller end of the pin 83 is a disk 84 which is recessed on its outer face to receive a locking pin 85 which extends transversely through the pin 83. Between the disk 84 and the adjacent convex surface of the part 57ª of the link is a split ring 86 having normally the shape shown in Fig. 28. In assembling the parts the pin 83 can be passed through the crank, link, and disk 84 and the securing pin 85 placed in position, then the snap ring 86 can be placed upon the sloping surface 84ª of the disk 84 and forced over the periphery of said disk, whereupon it snaps into position between said disk and the convex face of the link as shown in Fig. 23. The resiliency of the ring 86 causes it to contract and thus hold the spherical surfaces of the crank, link and pin 83 in snug contact with each other so that as wear of these contacting surfaces occurs the spring ring 86 automatically takes up the slack and compensates for the wear. The pin 83 is preferably provided with a lubricant nipple 83ᵇ and suitable passages to conduct the lubricant to the contacting spherical surfaces of the connection.

The lower end of the link 57 is connected to the axle 52 by means of a bracket 87 which is clamped to the axle 52 in the usual manner and is formed with a concavo-convex end which is secured to the lower end of the link 57 by means of a joint or connection similar to that which connects the upper end of the link to the crank, so that the lower connection need not be further described.

Figs. 18, 19, 23, 24 and 25 represent the parts of the apparatus in their normal positions corresponding to the normal load of the vehicle with the latter standing still or moving over a smooth and even surface and it will be observed that with the piston 62 in its intermediate position the crank 56 is in an approximately horizontal position and at an angle only slightly less than 90° with the link 57, while when the vehicle spring 53 is fully compressed the crank 56 (as shown by the dotted lines in Fig. 18) has turned to a position approaching the vertical and is at a very acute angle with the link 57.

It will be understood that in the use of the second form of shock absorber now being described, just as in the case of the first form of construction, the vehicle is preferably fitted in the usual manner with a set of four of the devices, one to control the action of each of the four springs.

As in the case of the first form of construction the second form of apparatus, while it can be designed as to size and proportion of parts, etc. to meet the widely varying conditions of service, it is especially applicable and is preferably designed for operation upon the cycle disclosed in my previously mentioned Reissue No. 17,409.

The shock absorber is prepared for use by introducing a suitable liquid into its working chambers and its reservoir, a 95 per cent solution of glycerin and alcohol being preferred for this purpose. The filling may be accomplished by removing the screw closure 68 of the casing, pouring the liquid into the reservoir chamber C' and then proceeding substantially as in the filling of the first form of shock absorber as above described.

With the second form of apparatus mounted on the vehicle in the manner described its operation is substantially the same as that of the first described shock absorber and it is believed that the operation will therefore be readily understood without further description. It will also be obvious that in order to insure that the second form of apparatus will function in the manner illustrated by the diagram of Fig. 3, the size and taper of the groove 77 and the adjustment of the seat 74 of the thermostatic valve 73 will be determined empirically to suit the character of the car upon which the apparatus is to be used. It will also be understood that as in the first form of construction the effect of the tapered groove 77 can be varied to a certain extent by angular adjustment of the piston 62 in relation to the crank arm 56, three of the different positions of adjustment of the piston being indicated by the full and dotted lines in Fig. 24.

It will be further understood that the modified form of packing 67 employed in the second form of construction functions in a manner equivalent to that of the packing 20 in the first form of construction, the resilience of the soft ring 67ᵇ in the second form of packing being relied upon to keep the packing surfaces in contact with the respective surfaces without the use of supplemental means such as the spring 21 employed in the first form of construction. Except for the formation of the passages 70 and 77 in the casing structure in the second form of the device, the piston construction has the advantage, pointed out in connection with the first form of construction, that many machining operations are combined in the one piston part thus greatly facilitating manufacturing operations.

In the second form of construction the ball and socket couplings of the link 57, while markedly different structurally from the link couplings of the first construction, yet embody the same principle that the spherical surfaces of the coupling are maintained in working contact, regardless of wear, by a relatively light spring which is rendered effective by the non-overhauling feature of the wedging action which the spring 86 has between the adjacent surfaces of the parts 57ᵃ and 84. In the case of the second form of construction, and for that matter in the case of the first form of construction, the empirical adjustment of the thermostatic valve may be effected in a suitable testing fixture in which the piston may be mounted and have its passages subjected to standard hydraulic pressures and adjustment of the thermostatic valve or of its seat effected to secure a desired effect known by test to correspond to the desired operation of the assembled mechanism under actual working conditions.

In the third form of construction shown in Figs. 29 to 35 I have embodied my novel thermostatic rebound control valve and a modified form of valve for automatically controlling the resistance to the spring compressing forces, in a double-acting apparatus employing two plunger-type pistons operating in separate cylinders. In this form of construction there is a casing structure 91 comprising the main casing part 91ᵃ and a cover part 91ᵇ which is secured to the body of the casing 91ᵃ by cap screws 92, 92, preferably with an interposed gasket 93 to form a liquid tight joint. The casing structure is formed with two upright cylinders 91ᶜ and 91ᵈ. In the cylinder 91ᶜ is a trunk type piston 94 and in the cylinder 91ᵈ is a similar piston 95. These pistons may be made by die casting and in such event the heads of the pistons are provided with hard steel inserts 94ᵃ and 95ᵃ, respectively. The two pistons are yieldingly pressed upward by suitable springs 96, 96 which engage the bottoms of the cylinders and the under sides of the piston heads. The two pistons are formed with small air bleeding ports 94ᵇ and 95ᵇ, respectively, which extend through the side walls of the pistons adjacent the heads thereof. With the pistons operatively mounted in the casing structure as described the interior of the casing is divided into two pressure chambers A'' and B'' and a reservoir chamber C''.

The side walls of the casing structure at the upper part thereof are provided with bearings 97 and 98 for the shaft 99 of an actuating crank 100. The shaft and crank are rigidly and preferably integrally connected together. The bearings 97 and 98 are preferably provided with suitable bushings 97ᵃ and 98ᵃ. Within the reservoir chamber C'' of the casing is a piston actuating member 101 which is rigidly secured to the shaft 99 by a tapered pin 102 and a screw plug 103 by means of which the tapered pin is forced and held in firm engagement with the shaft and the member 101. The dimensions of the parts are such that when they are assembled as shown in the drawing the faces of the crank 100 and of the member 101 are held in close contact with the adjacent faces of the bearing 97 so that the bearing is rendered practically proof against leakage of liquid, though if desired a packing ring may be interposed between the inner side of the crank arm and the end of the bearing 97. Leakage through the other bearing 98 is prevented by a plate 104 which is forced into the aperture of the bearing 98 with a tight fit. The member 101 is formed with piston-actuating arms 101ᵃ and 101ᵇ which engage the hardened inserts of the pistons 94 and 95 respectively so that when the shaft is rocked in one direction the piston 94 is forced downward while the other piston is permitted to rise under the pressure of its spring 96 and when the rock shaft is turned in the opposite direction the piston 95 is forced downward while the piston 94 is permitted to rise under the pressure of its spring 96.

The apparatus is designed to have a body of suitable liquid such as oil or the glycerin solution previously referred to, introduced into the pressure chambers A'', B'' and the reservoir C'' so as to fill the pressure chambers and at least partially fill the reservoir. To provide for suitably controlled movement of the pistons 94 and 95 the casing structure is provided near the lower part thereof with passages constituting two separate conduits between the pressure chambers A'' and B'', said conduits forming, so to speak, two parallel means of communication between the two pressure chambers. One of these conduits is formed in part by a valve chamber 105 (Fig. 33) which at one side is connected by a zig-zag passage 106 with pressure chamber B'', while at its other side it is connected by a passage 107 with the pressure chamber A'', the passage 107 being formed partly in the casing structure proper and partly in a screw plug 108 which closes the lower end of the valve chamber 105. The passage 106 is provided with a spring pressed check valve 109 which permits liquid flow in one direction only, viz. from the chamber A'' to the chamber B''. The passage of liquid through this conduit is further controlled by a valve 110, the lower peripheral edge of which cooperates with the adjacent annular upper face of the plug 108 to restrict flow of liquid through the passages 108 and 106. The valve 110 has an elongated stem 110ᵃ which extends upward in a suitable bore formed in the casing structure as shown in Fig. 31. the upper end of the bore forming an abutment against which the stem is pressed by the spring 111 interposed between the valve 110 and the plug 108. The valve stem 110ᵃ is made of material, such as ebonite, having a higher coefficient of thermal expansion than the metal casing structure, and preferably the valve 110 and its stem 110ᵃ are integrally formed of the same material. It will be observed that a washer 112 is interposed between the flanged head of the plug 108 and the casing and, by providing washers of different thicknesses, the upper annular face of the plug can be adjusted to different positions relative to the valve 110 by the use of different washers.

The second conduit affording communication between the lower ends of the chambers A'' and B" is formed in part by a valve chamber 113 which is provided by forming the middle part of the main casing with an upright cylindrical bore extending from the bottom of the casing member to the reservoir C" at the upper end thereof. The conduit in question consists further of a zig-zag passage 114 extending from the valve chamber 113 to the pressure chamber A", the passage 114 being provided with a spring pressed check valve 115 which permits flow only from the valve chamber to the pressure chamber A". The said conduit is completed by the passage 116 which is formed in part in the main casing member 91ª and in part in a screw plug 117 which closes the lower end of the valve chamber 113, the said passage 116 affording communication between the latter valve chamber and the pressure chamber B". The second conduit that is provided between the pressure chambers A" and B" has in addition to the check valve 115 a further controlling means in the form of a valve 118 which cooperates with a seat 117ª formed on the upper end of the plug 117. The valve 118 is provided with a compound thermostatic stem designated as an entirety by 119 and comprising a tubular part 119ª which rests upon the valve 118, a second tubular part 119ᵇ within the part 119ª and a rod like part 119ᶜ within the tubular part 119ᵇ. The part 119ᵇ has its upper end flanged outward to rest upon the upper end of the part 119ª and its inner end flanged inward to support the part 119ᶜ. The parts 119ª and 119ᶜ are formed of some material, such for example as ebonite, having a higher coefficient of expansion than metal while the part 119ᵇ is formed of metal. The upper end of the stem part 119ᶜ is fitted with a hardened metal cap 119ᵈ which is designed to engage with a cam 101ᶜ formed on the member 101, the contact cap 119ᵈ being maintained in continuous engagement with the cam by a spring 120 which is interposed between the valve 118 and the seat plug 117 and serves to press the valve upward away from its seat. The cam 101ᶜ is so formed that the valve 118 is held substantially fully opened when the parts of the device are in the positions shown in the drawings and is moved toward its seat 117ª as the piston 95 is moved downward in the pressure chamber B" by rotation of the crank shaft 99. To supplement the movement of the valve 118 caused by the cam 101ᶜ, the plug 117 carrying the valve seat 117ª is made adjustable by the use of a washer 121 interposed between the flanged head of the plug and the adjacent face of the valve casing and by using washers of different thicknesses the valve seat 117ª can be adjusted upward and downward to the small extent that may be needed to give the precise valve action desired.

The casing member 91 is provided with apertured lugs 91ᵉ, 91ᵉ by which it can be rigidly bolted to the chassis frame, or if desired to the axle, of the vehicle. Assuming that the casing structure is bolted to the side channel member of the chassis frame in the same manner as the shock absorber shown in Fig. 1, the crank 100, with its spherical end as shown in Fig. 30, is connected by suitable link and coupling devices of the character shown in Figs. 1 and 4. As these devices have been fully shown and described in connection with the first form of construction, they are not shown in connection with the last form of the device and it will not be necessary to further describe them here. However it is observed that with this last form of shock absorber I prefer to dispose the crank arm 100 in somewhat different angular relation than that shown in Fig. 1, as will be further explained below.

The last described shock absorber can be constructed and adjusted to vary the cycle of hydraulic resistances offered by the device but I prefer to construct and operate it so as to give the cycle covered by my Reissue No. 17,409 and permit the use on the vehicle of soft and flexible suspension springs. In the operation of the device on the said cycle, assuming that the pressure chambers A" and B" have been filled and the reservoir C" at least partially filled with the working liquid, and that a set of the devices has been mounted upon the vehicle in the manner referred to, the parts of the apparatus within the main casing occupy the positions indicated by the dotted lines in Fig. 29 when the vehicle springs are in their normal state, that is to say, when the vehicle is normally loaded and is either standing still or moving over a smooth and even road surface. When a wheel of the vehicle encounters an unevenness in the road surface, for example an upstanding obstruction, the corresponding suspension spring of the vehicle is compressed, the crank arm 100 is swung upward with the result that the piston 95 is forced downward against the pressure of its spring 96 while the other piston 94 is permitted to rise under the pressure of its spring 96. During this movement liquid is forced from the pressure chamber B" through the conduit controlled by the valve 118 into the pressure chamber A". During the first part of the downward movement of the piston 95 and the corresponding upward movement of the crank 100 the resistance offered to the flow of liquid by the valve 118 is not sufficient to be appreciable to an occupant of the vehicle but as the movement continues and the valve 118 is forced further downward by the cam 101ᶜ the throttling action of the valve 118 becomes appreciable and in fact rapidly, though gradually, increases the resistance to the liquid flow so that the resistance offered by the vehicle spring to its compression is gradually but very strongly supplemented by the checking action of the shock absorber. In case the obstruction encountered is a large one or in case the obstruction is encountered at high speed so that the shock is great, the compression of the springs may go so far that the shock is partially absorbed by the rubber bumper, if the latter be employed. In any case the liquid resistance offered to the compression of the vehicle spring finally reaches a maximum toward the end of the movement and thereafter the pressure in the chamber B" rapidly falls to zero. Thereupon the resilience of the vehicle spring causes it to expand and the crank arm 100 is swung downward with the result that the piston 94 is forced downward while the piston 95 is permitted to rise. During this movement liquids is forced from the pressure chamber A" past the controlling valve 110 into the pressure chamber B", the valve 110 affording resistance which causes the pressure in the chamber A" to rise sufficiently to adequately check the expansion or rebound of the vehicle spring. The rebound may carry the parts somewhat past their normal positions but they thereupon return substantially to normal position and there remain until some other road inequality is encountered. The pressures set up in the pressure chambers B" and A" are of the character indicated by the curves $a$ and $b$ in Fig. 3, those parts of the curves above the horizontal axis x—x representing the pressures in the chamber B" while those parts of the curves below the said axis represent the pressures in the chamber A". Accordingly, just as in the cases of the first and second forms of construction, this third construction realizes the previously described advantages incident to soft suspension spring together with the lateral stabilizing effect of the rebound resistances when the parts are at or near their normal positions.

With the temperatures changing from summer to winter, or vice versa, the thickness and viscosity of the working liquid of the shock absorber changes, but this is compensated for by the thermostatically controlled valves 110 and 118 because of the differential expansion of their stems and the metallic structure in which they are mounted, the valves being moved towards their seats with rise of temperature and drawn away from their seats with fall of the temperature. In this connection it is observed that the multiple or compound form of valve stem 119 gives it approximately double the effective length of the stem of the valve 110, this being desirable because of the smaller diameter of the valve 118 which is controlled by the stem 119. By adjusting the valve seat plugs 108 and 117 the throttling actions of the valves 110 and 118, respectively, can be adjusted to suit the requirements of the particular size and type of car on which the shock absorber is mounted.

In the operation of the device as the pistons 94 and 95 move up and down they from time to time have their small ports 94$^b$ and 95$^b$ lifted into communication with the space of the reservoir C" so that if any air should accumulate under the said pistons it is permitted at such times to escape into said reservoir and rise to the top thereof and at such times, also, oil is permitted to flow from the reservoir C" through said ports 94$^b$ and 95$^b$ into the pressure chambers A" and B" to replenish any lack of liquid that may arise therein. It should be understood that the ports 94$^b$ and 95$^b$ are made quite small so that any leakage of liquid therethrough while the pistons are being forced downward is so small as to be negligible considering the rapid movement of said pistons incident to shocks. While the pistons 94 and 95 are free to turn in their cylinders and the ports 94$^b$ and 95$^b$ may thus be moved from their positions shown in Fig. 29 into positions in which they would never rise above the adjacent surrounding cylindrical wall, they will in such case nevertheless continue to perform their functions since with each downward movement of the piston actuating arms 101$^a$ and 101$^b$ the latter tend to move the pistons laterally away from the outer sides of their cylinders and toward their inner sides, thus tending to open a line of communication between the pressure chambers A" and B" and the reservoir C" through ports 94$^b$ and 95$^b$.

In the last form of construction I prefer to make the shock absorber so that the crank arm 100 is disposed in a downwardly inclined position, as indicated by the broken line c in Fig. 29, when the parts are in their normal positions and is disposed in an upwardly inclined position as indicated by the broken line d when the vehicle spring is fully compressed; so that with the shock absorber casing mounted on the channel bar of the vehicle frame in the same position in relation to the axle as indicated in Fig. 1, the link connecting the crank arm and the axle will not be swung into interference with the casing of the shock absorber when the vehicle spring is compressed and yet a transmission of force from the vehicle axle to the shock absorber pistons will be effected with a mechanical advantage that decreases to at least some extent as the vehicle spring is compressed and the hydraulic resistance increases.

Each of the three forms of shock absorbers which have been described is automatically adjustable in operation to the entire range of road conditions, speeds of travel and temperatures likely to be encountered. Thus in the first and second forms of instrument the tapered groove valve and in the third instrument the cam-operated valve serves to vary the effective capacity of the conduit controlled by it in such a manner that there is little or no resistance offered or energy dissipated by the action of such valve when relative movements of the vehicle wheel and body are of small or moderate amplitude, as when driving over a good road surface or at moderate speed, while in the case of relative movements of wheel and body of greater amplitude, as in driving over rough road surfaces or at high speed, the said valve reduces the effective capacity of the conduit controlled by it more or less according to the amplitude of the spring-compression movement, which movement in turn is determined by the intensity of the force which is transmitted from the unsprung mass, including the ground wheel, to the suspension spring and causes compression thereof. And in each of the three instruments described the thermostatic valve which controls the flow of the liquid under pressure during rebound of the suspension spring is automatically adjusted with change in temperature in a manner approximately to compensate for changes in the viscosity of the working liquid corresponding to the temperature changes. In the third form of instrument described the cam-operated valve, which affords a variable resistance to the liquid under pressure during spring compression, also acts automatically to compensate for changes in the viscosity of the liquid. However, I consider that this compensation is of lesser importance than that of the valve controlling rebound because it is ineffective during spring-compression movements of moderate amplitude while during the later parts of spring-compression movements of wide amplitude the precise resistance offered at any particular point in the movement is of less significance than is the value of the more moderate resistance during the rebound movement, particularly during rebound movements corresponding to spring compressions of moderate amplitude. In these latter movements it is desirable, in the interest of easy riding, that the suspension spring have as much freedom of movement as possible, otherwise the softness or flexibility of the spring is not fully realized. However, complete freedom of spring action during such moderate spring movements cannot be had without loss of stability if springs of desired flexibility are used. To insure lateral stability of the vehicle body with reasonably soft suspension springs I find that a substantial resistance to rebound movement when the parts are at or near their normal positions is essential, although the resisting forces essential for this purpose are moderate in comparison with the resisting forces which come into action both during spring compression and rebound in movements of wide amplitude. Consequently the changes in resistance which would be caused by variation in the viscosity of the working liquid if there were no automatic compensation for the latter changes are sufficiently large, in comparison with the moderate minimum resistance which must be opposed to rebound to insure stability, to cause a very noticeable unfavorable effect upon the riding quality of a vehicle driven over relatively good road surfaces.

In view of the considerations noted in the last preceding paragraph, I prefer in designing the valves of my improved shock absorber to make the resistance of the valve controlling the rebound movement approach as nearly as possible the minimum value necessary to secure stability of the vehicle and then to design the tapered groove valve (or the cam-operated valve) so that the energy dissipated by it, together with the energy dissipated by the valve controlling rebound, shall be sufficient to afford adequate control of the suspension spring. Such design is more readily possible with the cycle of operation shown in Fig. 3 of the drawings than with that characterizing the shock absorber disclosed in my Patent Reissue No. 17,409 because of the greater resistance to rebound afforded by the instruments above described during the first part of the rebound movement. However, whether the precise relationship of the actions of the two valves which I have referred to as preferred is employed or is not employed, it will be observed that the shock absorbers of my present application are characterized by means for controlling the flow of the working liquid under pressure which, in the case of suspension spring movements of wide amplitude, offers a resistance to some part of the piston movement corresponding to spring compression and spring rebound which is automatically varied to an extent determined by the amplitude of the spring-compression movement and which, in the case of spring and piston movements of lesser amplitude, offers to the liquid flow caused by rebound movement of the piston in the region of its normal position a moderate resistance which is automatically maintained substantially constant for a given piston speed notwithstanding variation in the viscosity of the working liquid.

Where the shock absorbers are to be produced in large quantities the type of construction of the first and second forms described above, is to be preferred. If the production is to be on a small scale the third form of construction might be considered more advantageous because of the more conventional machining methods which are contemplated in connection with it. The more special machining methods and the corresponding special equipment contemplated in connection with the first and second forms of construction are amply justified when larger scale production is involved and make the latter forms of construction decidedly preferable under such conditions.

It should be understood that my improved shock absorber in any of its various forms can be mounted either as shown in the drawings or in any of the well known ways of mounting such apparatus. For example the shock absorber casing can be mounted on the axle instead of on the chassis frame, and in either case it can be mounted with its crank arm in a plane extending transversely instead of longitudinally of the vehicle.

In other respects it will be understood that the invention is not limited to the particular forms of construction which have been shown and described for purposes of explanation and illustration but that the construction shown can be varied widely within the scope of the appended claims.

Certain features of the first two forms of construction described above, more particularly features relating to the casing structure, are not claimed in the present application as they constitute subject matter claimed in my copending application Serial No. 496,909, filed November 20, 1930.

What I claim is:

1. In a shock absorber, the combination of a casing adapted to hold a body of liquid; a shaft extending from the outside to the inside of said casing through the wall structure thereof and rotatable in relation thereto; and a double-acting liquid-forcing means in said casing comprising a substantially sector-shape chamber, a swinging piston disposed in said sector-shape chamber and dividing it into two pressure chambers, said piston being connected to the said shaft, two conduits forming parallel connections between the two pressure chambers, check valves carried by the piston and controlling said conduits to permit passage of liquid between said chambers in one direction only in each conduit, and means associated with each conduit and carried by the piston for controlling the liquid flow through said conduit in the direction permitted by the check valve associated with said conduit, the said controlling means operating independently of said check valve.

2. In a shock absorber, the combination of a casing adapted to hold a body of liquid; a shaft extending from the outside to the inside of said casing through the wall structure thereof and rotatable in relation thereto; and a double-acting liquid forcing means in said casing comprising a substantially sector-shape chamber, a swinging piston disposed in said sector-shape chamber and dividing it into two pressure chambers, said piston being connected to the said shaft, two conduits forming parallel connections between the two pressure chambers, check valves carried by the piston and controlling said conduits to permit passage of liquid between said chambers in one direction only in each conduit, and means associated with each conduit and carried by the piston for controlling the liquid flow through said conduit in the direction permitted by the check valve associated with said conduit, the said means associated with one of the conduits being adapted automatically to vary the capacity of said contduit to an extent determined by the extent of the piston movement in the casing chamber.

3. In a shock absorber, the combination of a casing adapted to hold a body of liquid; a shaft extending from the outside to the inside of said casing through the wall structure thereof and rotatable in relation thereto; and a double-acting liquid-forcing means in said casing comprising a substantially sector-shape chamber, a swinging piston disposed in said sector-shape chamber and dividing it into two pressure chambers, said piston being connected to the said shaft, two conduits forming parallel connections between the two pressure chambers, check valves carried by the piston and controlling said conduits to permit passage of liquid between said chambers in one direction only in each conduit, and means associated with each conduit and carried by the piston for controlling the liquid flow through said conduit in the direction permitted by the check valve associated with said conduit, the said means associated with one of the conduits acting independently of said check valve automatically to vary the capacity of the said conduit as the temperature of the apparatus changes.

4. In a shock absorber, the combination of a casing adapted to hold a body of liquid; a shaft extending from the outside to the inside of said casing through the wall structure thereof and rotatable in relation thereto; and a double-acting liquid-forcing means in said casing comprising a substantially sector-shape chamber, a swinging piston disposed in said sector-shape chamber and dividing it into two pressure chambers, said piston being connected to the said shaft, two conduits forming parallel connections between the two pressure chambers, check valves carried by the piston and controlling said conduits to permit passage of liquid between said chambers in one direction only in each conduit, and means associated with each conduit for controlling the liquid flow through said conduit in the direction permitted by the check valve associated with said conduit, the said means associated with the said conduits being adapted automatically to vary the capacity of one of said conduits to an extent determined by the extent of the piston movement and automatically to vary the capacity of one of the said conduits as the temperature of the apparatus changes.

5. In a shock absorber, the combination of a casing adapted to hold a body of liquid; actuating means extending from the outside to the inside of said casing through the wall structure thereof; and a double-acting liquid-forcing means in said casing comprising two pressure chambers, piston means in said chambers operable by the said actuating means, two separate independent parallel connections between the pressure chambers, check valves controlling said conduits to permit passage of liquid between said chambers in one direction only in each conduit, and separate means associated with the two conduits, respectively, for controlling the liquid flow through each conduit in the direction permitted by the check valve associated therewith, the said control means of one of the conduits being adapted to restrict the flow therethrough while the piston moves in one direction away from its normal intermediate position.

6. In a shock absorber, the combination of a casing adapted to hold a body of liquid; actuating means extending from the outside to the inside of said casing through the wall structure thereof; and a double-acting liquid-forcing means in said casing comprising two pressure chambers, piston means in said chambers operable by the said actuating means, two separate conduits forming independent parallel connections between the pressure chambers, check valves controlling said conduits to permit passage of liquid between said chambers in one direction only in each conduit, and separate means associated with the two conduits, respectively, for controlling the liquid flow through each conduit in the direction permitted by the check valve associated therewith, the said means associated with one of the conduits being adapted automatically to vary the effective capacity of said conduit with movement of the piston means away from its normal position.

7. In a shock absorber, the combination of a casing adapted to hold a body of liquid; actuating means extending from the outside to the inside of said casing through the wall structure thereof; and a double-acting liquid-forcing means in said casing comprising two pressure chambers, piston means in said chambers operable by the said actuating means, two conduits forming parallel connections between the pressure chambers, check valves controlling said conduits to permit passage of liquid between said chambers in one direction only in each conduit, and separate means associated with the two conduits, respectively, for controlling the liquid flow through each conduit in the direction permitted by the check valve associated therewith, the said means associated with one of the conduits being adapted automatically to vary the effective capacity of the said conduit as the temperature of the apparatus changes and the said means associated with the other conduit being adapted to vary the effective capacity of said conduit to an extent determined by the extent of movement of the piston means away from its normal position.

8. In a shock absorber, the combination of a casing adapted to hold a body of liquid; actuating means extending from the outside to the inside of said casing through the wall structure thereof; and a double-acting liquid-forcing means in said casing comprising two pressure chambers, piston means in said chambers operable by the said actuating means, two conduits forming parallel connections between the pressure chambers, check valves controlling said conduits to permit passage of liquid between said chambers in one direction only in each conduit, and separate means associated with the two conduits, respectively, for controlling the liquid flow through each conduit in the direction permitted by the check valve associated therewith, the said means associated with the said conduits being adapted automatically to vary the effective capacity of one of said conduits with movement of the piston means and automatically to vary the effective capacity of one of the said conduits as the temperature of the apparatus changes.

9. In a shock absorber, the combination of a casing adapted to hold a body of liquid; a shaft extending from the outside to the inside of said casing through the wall structure thereof and rotatable in relation thereto; and a double-acting liquid-forcing means in said casing comprising a substantially sector-shape chamber, a swinging piston disposed in said sector-shape chamber and dividing it into two pressure chambers, said piston being connected to the said shaft, two conduits forming parallel connections between the two pressure chambers, check valves carried by the piston and controlling said conduits to permit passage of liquid between said chambers in one direction only in each conduit, and means associated with each conduit for controlling the liquid flow through said conduit in the direction permitted by the check valve associated with said conduit, the said control means of one of the conduits being adapted to restrict the flow therethrough increasingly with movement of the piston in one direction away from its normal intermediate position.

10. In a shock absorber, the combination of a casing adapted to hold a body of liquid; a shaft extending from the outside to the inside of said casing through the wall structure thereof and rotatable in relation thereto; and a double-acting liquid-forcing means in said casing comprising a substantially sector-shape chamber, a swinging piston disposed in said sector-shape chamber and dividing it into two pressure chambers, said piston being connected to the said shaft, two conduits forming parallel connections between the two pressure chambers, check valves carried by the piston and controlling said conduits to permit passage of liquid between said chambers in one direction only in each conduit, and means associated with each conduit for controlling the liquid flow through said conduit in the direction permitted by the check valve associated with said conduit, the said means associated with one of the conduits being adapted automatically to vary the capacity of said conduit to an extent determined by the extent of the piston movement in the casing chamber.

11. In a shock absorber, the combination of a casing adapted to hold a body of liquid; a shaft extending from the outside to the inside of said casing through the wall structure thereof and rotatable in relation thereto; and a double-acting liquid-forcing means in said casing comprising a substantially sector-shape chamber, a swinging piston disposed in said sector-shape chamber and dividing it into two pressure chambers, said piston being connected to the said shaft, two conduits forming parallel connections between the two pressure chambers, check valves carried by the piston and controlling said conduits to permit passage of liquid between said chambers in one direction only in each conduit, and means associated with each conduit for controlling the liquid flow through said conduit in the direction permitted by the check valve associated with said conduit, the said means associated with one of the conduits acting independently of said check valve automatically to vary the capacity of the said conduit as the temperature of the apparatus changes and the said means associated with the other conduit being adapted to vary the effective capacity of said conduit to an extent determined by the extent of movement of the piston means away from its normal position.

12. In a shock absorber, the combination of a casing adapted to hold a body of liquid; a shaft extending from the outside to the inside of said casing through the wall structure thereof and rotatable in relation thereto; and a double-acting liquid-forcing means in said casing comprising a substantially sector-shape chamber, a swinging piston disposed in said sector-shape chamber and dividing it into two pressure chambers, said piston being connected to the said shaft, two conduits forming parallel connections between the two pressure chambers, check valves carried by the piston and controlling said conduits to permit passage of liquid between said chambers in one direction only in each conduit, and means associated with each conduit for controlling the liquid flow through said conduit in the direction permitted by the check valve associated with said conduit, the said means associated with the said conduits being adapted automatically to vary the capacity of one of said conduits to an extent determined by the extent of the piston movement and automatically to vary the capacity of one of the said conduits as the temperature of the apparatus changes.

13. In a shock absorber, the combination of a casing adapted to hold a body of liquid; actuating means extending from the outside to the inside of said casing through the wall structure thereof; and a double-acting liquid-forcing means in said casing comprising two pressure chambers, piston means in said chambers operable by the said actuating means, two conduits forming parallel connections between the pressure chambers, check valves controlling said conduits to permit passage of liquid between said chambers in one direction only in each conduit, and separate means associated with the two conduits for controlling the liquid flow through each conduit in the direction permitted by the check valve associated therewith, the said means associated with the said conduits being adapted automatically to vary the capacity of one of said conduits with change in temperature of the apparatus and automatically to vary the capacity of the other of said conduits with movement of the piston means and also with change in temperature of the apparatus.

14. In a shock absorber, the combination of a casing adapted to hold a body of liquid; a shaft extending from the outside to the inside of said casing through the wall structure thereof and rotatable in relation thereto; and a double-acting liquid-forcing means in said casing comprising a substantially sector-shape chamber, a swinging piston disposed in said sector-shape chamber and dividing it into two pressure chambers, said piston being connected to the said shaft, two conduits forming parallel connections between the two pressure chambers, check valves controlling said conduits to permit passage of liquid between said chambers in one direction only in each conduit, means for controlling the flow of liquid through one conduit adapted to offer to the movement of the piston a negligible resistance during the first part of its movement from its normal intermediate position toward one extreme and a gradually increasing resistance during the latter part of the said movement, and means for controlling the flow of liquid in the other conduit adapted to offer to the movement of the piston in the reverse direction a resistance which is appreciable when the piston is in the region of its normal intermediate position.

15. In a shock absorber, the combination of a casing adapted to hold a body of liquid; and liquid-forcing means in said casing comprising a chamber, metal piston means movable therein, a conduit affording liquid outlet from said chamber, a valve controlling the conduit passage and comprising a valve proper and an elongated stem, the valve in operation being substantially balanced with respect to the inlet pressure in the conduit controlled by said valve and the stem of said valve being formed of material having a higher coefficient of thermal expansion than the metallic structure in which it is mounted, whereby change in temperature of the apparatus causes differential expansion of the valve stem and said metallic structure to compensate for change of viscosity of the said liquid.

16. In a shock absorber, the combination of a casing structure having two upright cylinders disposed side by side and a reservoir with which said cylinders communicate at their upper ends, the cylinder and reservoir chambers of the casing structure being adapted to hold a body of liquid; a single-acting piston disposed in each of said cylinders; means, comprising a crank shaft having a bearing support in the reservoir section of the casing, for reciprocating the two pistons simultaneously in opposite directions; passages for liquid forming two parallel lines of communication between the lower ends of the cylinders; and means for controlling the flow of liquid through said passages, the said controlling means in the case of at least one of the said passages being responsive to temperature changes to reduce the capacity of said passage when the temperature rises and to increase it when the temperature falls.

17. In a shock absorber, the combination of a casing structure having two upright cylinders disposed side by side and a reservoir with which said cylinders communicate at their upper ends, the cylinder and reservoir chambers of the casing structure being adapted to hold a body of liquid; a single-acting piston disposed in each of said cylinders; means, comprising a crank shaft having a bearing support in the reservoir section of the casing, for reciprocating the two pistons simultaneously in opposite directions; passages for liquid forming two parallel lines of communication between the lower ends of the cylinders; and means for controlling the flow of liquid through said passages, the said means for controlling said passages being responsive to temperature changes to reduce the capacity of the passages when the temperature rises and to increase it when the temperature falls.

18. In a shock absorber for controlling relative movements of a road-supported vehicle part and a second vehicle part supported from the road-suported part by means comprising a suspension spring, the combination of a casing structure adapted to hold a body of liquid and to be secured to one of said vehicle parts; liquid-forcing means in the casing comprising a chamber and piston means movable in the chamber; piston-actuating means extending to the exterior of the casing and adapted to be connected to the other of said vehicle parts; conduit means through which the flow of liquid is forced by movement of the piston means in the chamber during compression and rebound of the suspension spring; and means for controlling said flow adapted automatically to vary the effective capacity of the conduit means during movement of the piston means away from normal position during spring compression and toward said position during spring rebound so as to offer to the first part of said movement a small resistance and to a later part of said movement relatively large resistance, the controlling means being further adapted automatically to maintain appreciable resistance to movement of the piston means in the rebound direction in the region of its normal position at a value between said small resistance and the maximum value of the said relatively large resistance and substantially constant for a given piston speed notwithstanding variation in the viscosity of the liquid.

19. In a shock absorber for controlling relative movements of a road-supported vehicle part and a second vehicle part supported from the road-supported part by means comprising a suspension spring, the combination of a casing structure adapted to hold a body of liquid and to be secured to one of said vehicle parts; liquid-forcing means in the casing comprising a chamber and piston means movable in the chamber; piston-actuating means extending to the exterior of the casing and adapted to be connected to the other of said vehicle parts; conduit means through which the flow of liquid is forced by movement of the piston means in the chamber during compression and rebound of the suspension spring; and means for controlling said flow adapted automatically to vary the effective capacity of the conduit means during movement of the piston means away from normal position during spring compression and toward said position during spring rebound so as to offer to the first part of said movement a small resistance and to a later part of said movement relatively large resistance determined in amount by the amplitude of the spring-compression movement, the controlling means being further adapted automatically to maintain appreciable resistance to movement of the piston means in the rebound direction in the region of its normal position at a value between said small resistance and the maximum value of the said relatively large resistance and substantially constant for a given piston speed notwithstanding variation in the viscosity of the liquid.

20. In a shock absorber for controlling relative movements of a road-supported vehicle part and a second vehicle part supported from the road-supported part by means comprising a suspension spring, the combination of a casing structure adapted to hold a body of liquid and to be secured to one of said vehicle parts; liquid-forcing means in the casing comprising a chamber and piston means movable in the chamber; piston-actuating means extending to the exterior of the casing and adapted to be connected to the other of said vehicle parts; conduit means through which the flow of liquid is forced by movement of the piston means in the chamber during compression and rebound of the suspension spring; and means for controlling the said flow of liquid comprising means functioning as a valve adapted automatically to vary the effective capacity of the conduit means during movement of the piston means away from normal position during spring compression and toward normal position during spring rebound so as to offer to the first part of said movement a small resistance and to a later part of said movement relatively large resistance and a valve adapted automatically to maintain appreciable resistance to movement of the piston means in the rebound direction in the region of its normal position at a value between said small resistance and the maximum value of the said relatively large resistance and substantially constant for a given piston speed notwithstanding variation in the viscosity of the liquid.

21. In a shock absorber for controlling relative movements of a road-supported vehicle part and a second vehicle part supported from the road-supported part by means comprising a suspension spring, the combination of a casing structure adapted to hold a body of liquid and to be secured to one of said vehicle parts; liquid-forcing means in the casing comprising a chamber and piston means movable in the chamber; piston-actuating means extending to the exterior of the casing and adapted to be connected to the other of said vehicle parts; conduit means through which the flow of liquid is forced by movement of the piston means in the chamber during compression and rebound of the suspension spring; and means for controlling the said flow of liquid comprising means functioning as a valve adapted automatically to vary the effective capacity of the conduit means during movement of the piston means away from normal position during spring compression and toward normal position during spring rebound so as to offer to the first part of said movement a small resistance and to a later part of said movement relatively large resistance determined in amount by the amplitude of the spring-compression movement and a valve adapted automatically to maintain appreciable resistance to movement of the piston means in the rebound direction in the region of its normal position at a value between said small resistance and the maximum value of the said relatively large resistance and substantially constant for a given piston speed notwithstanding variation in the viscosity of the liquid.

22. In a shock absorber for controlling relative movements of a road-supported vehicle part and a second vehicle part supported from the road-supported part by means comprising a suspension spring, the combination of a casing structure adapted to hold a body of liquid and to be secured to one of said vehicle parts; liquid-forcing means in the casing comprising a chamber and piston means movable in the chamber; piston-actuating means extending to the exterior of the casing and adapted to be connected to the other of said vehicle parts; conduit means through which the flow of liquid is forced by movement of the piston means in the chamber during compression and rebound of the suspension spring; and means for controlling the said flow of liquid comprising means functioning as a valve adapted automatically to vary the effective capacity of the conduit means during movement of the piston means away from normal position during spring compression and toward normal position during spring rebound so as to offer to the first part of said movement a small resistance and to a later part of said movement relatively large resistance determined in amount by the amplitude of the spring-compression movement and having its highest value when the suspension spring is in the region of maximum compression for any given movement and a valve adapted automatically to maintain appreciable resistance to movement of the piston means in the rebound direction in the region of its normal position at a value between the said small resistance and the maximum value of said relatively large resistance and substantially constant for a given piston speed notwithstanding variation in the viscosity of the liquid.

23. In a shock absorber, the combination of a metallic casing adapted to hold a body of liquid; and liquid-forcing means in said casing comprising a chamber, metal piston means movable therein, a conduit affording liquid outlet from said chamber, a valve controlling the conduit passage and having an elongated stem of ebonite, and an abutment for the valve stem in the metallic structure of the shock absorber at a point remote from the connecting point of the stem and valve.

24. The combination with a substantially liquid tight casing; a working device therein; and a shaft and crank structure, the shaft part of which is connected to the rotary device and extends through and is rotatable in a wall of the casing structure with the crank part disposed outside of the casing structure; of means forming a substantially liquid tight joint between the casing structure and the shaft and crank structure and comprising a relatively soft packing ring interposed between the casing structure and the adjacent surface of the crank, a metal ring having a part interposed between the soft packing ring and the said surface of the crank, and a spring for yieldingly pressing the metal and soft packing rings into engagement with the casing and crank.

25. In a hydraulic shock absorber for vehicles, the combination of a casing having two pressure chambers therein for a working liquid; piston means operatively mounted for movement in said pressure chambers; means extending from the interior to the exterior of the casing for actuating the piston means; conduit means forming passageways for the flow of liquid into and out of each of the pressure chambers; means comprising devices functioning as a valve and adapted to control the flow of liquid out of one of the pressure chambers corresponding to the compression of the vehicle spring and offer to the movement of the piston-actuating means a small resistance during the first part of the movement thereof from the normal intermediate position thereof toward one extreme and a gradually increasing resistance during the latter part of the said movement; and means comprising a valve adapted to control the flow of liquid out of the other pressure chamber and offer to the movement of the piston-actuating means in the reverse direction a moderate resistance to check the expansion of the vehicle spring when said piston-actuating means is in the region of the normal intermediate position thereof and further adapted automatically to vary the effective capacity of the passageway controlled by it approximately to compensate for variation in the viscosity of the liquid.

26. In a hydraulic shock absorber for vehicles, the combination of a casing having two pressure chambers therein for a working liquid; piston means operatively mounted for movement in said pressure chambers; means extending from the interior to the exterior of the casing for actuating the piston means; conduit means forming passageways for the flow of liquid from each pressure chamber to the other; means comprising devices functioning as a valve and adapted to control the flow of liquid from one pressure chamber to the other and offer to the movement of the piston-actuating means corresponding to the compression of the vehicle spring a small resistance during the first part of the movement thereof from the normal intermediate position thereof toward one extreme and a gradually increasing resistance during the latter part of the said movement; and means comprising a valve adapted to control the flow of liquid from the said other pressure chamber into the first pressure chamber and offer to the movement of the piston-actuating means in the reverse direction a moderate resistance to check the expansion of the vehicle spring when said piston-actuating means is in the region of the normal intermediate position thereof and further adapted automatically to vary the effective capacity of the passageway controlled by it approximately to compensate for variation in the viscosity of the liquid.

27. In a hydraulic shock absorber for vehicles, the combination of a casing having two pressure chambers therein for a working liquid; piston means operatively mounted for movement in said pressure chambers; means extending from the interior to the exterior of the casing for actuating the piston means; conduit means forming passageways for the flow of liquid into and out of each of the pressure chambers; means comprising devices functioning as a valve and adapted to control the flow of liquid out of one of the pressure chambers corresponding to the compression of the vehicle spring and offer to the movement of the piston-actuating means a small resistance during the first part of the movement thereof from the normal intermediate position thereof toward one extreme and a gradually increasing resistance during the latter part of the said movement; and thermostatic means adapted to control the flow of liquid out of the other pressure chamber and offer to the movement of the piston-actuating means in the reverse direction a moderate resistance to check the expansion of the vehicle spring when the said piston-actuating means is in the region of the normal intermediate position thereof and further adapted automatically to vary the effective capacity of the passageway controlled by it approximately to compensate for variation in the viscosity of the liquid.

28. In a shock absorber for controlling relative movements of a road-supported vehicle part and a second vehicle part supported from the road-supported part by means comprising a suspension spring, the combination of a casing structure adapted to hold a body of liquid and to be secured to one of said vehicle parts; liquid-forcing means in the casing comprising a chamber and piston means movable in the chamber; piston-actuating means extending to the exterior of the casing and adapted to be connected to the other of said vehicle parts; conduit means through which the flow of liquid is forced by movement of the piston means in the chamber during compression and rebound of the suspension spring; and means for controlling the said flow of liquid comprising means functioning as a valve and adapted to offer to the movement of the piston means in a range apart from its normal position a large resistance variable automatically with the maximum amplitude of the movement of the piston away from its normal position and a valve adapted to offer to the movement of the piston means in the rebound direction in the region of the normal position of said piston means a more moderate resistance and automatically to maintain said moderate resistance substantially constant for a given speed of the piston means notwithstanding variation in the viscosity of the liquid.

GORDON R. PENNINGTON.